US010247327B2

(12) United States Patent
Doughty et al.

(10) Patent No.: US 10,247,327 B2
(45) Date of Patent: Apr. 2, 2019

(54) BOILER FILL VALVE WITH FAST-FILL AND NON-OSCILATTING DIAL FEATURES

(71) Applicant: Watts Regulator Co., North Andover, MA (US)

(72) Inventors: Jason Doughty, Fitchburg, MA (US); Matthew Fratantonio, Northborough, MA (US); Paul J. Lake, Waltham, MA (US)

(73) Assignee: Watts Regulator Co., North Andover, MA (US)

( * ) Notice: Subject to any disclaimer, the term of this patent is extended or adjusted under 35 U.S.C. 154(b) by 72 days.

(21) Appl. No.: 15/401,997

(22) Filed: Jan. 9, 2017

(65) Prior Publication Data

US 2017/0198830 A1    Jul. 13, 2017

Related U.S. Application Data

(60) Provisional application No. 62/276,357, filed on Jan. 8, 2016.

(51) Int. Cl.
| | | |
|---|---|---|
| *F16K 37/00* | (2006.01) | |
| *G05D 16/00* | (2006.01) | |
| *F22D 5/00* | (2006.01) | |

(52) U.S. Cl.
CPC ............ *F16K 37/0008* (2013.01); *F22D 5/00* (2013.01); *G05D 16/00* (2013.01)

(58) Field of Classification Search
CPC ....... F16K 37/0008; F22D 5/00; G05D 16/00; Y10T 137/7793; Y10T 137/7797; Y10T 137/7807; Y10T 137/7831; Y10T 137/8158; Y10T 137/8225; Y10T 137/8275; Y10T 137/8292; Y10T 137/8309

See application file for complete search history.

(56) References Cited

U.S. PATENT DOCUMENTS

| | | |
|---|---|---|
| 1,340,790 A | 5/1920 | O'Neil |
| 2,842,151 A | 7/1958 | Cunningham, Jr. et al. |

(Continued)

OTHER PUBLICATIONS

Watts, Series 1156F, T156B and N256 Feed Water Pressure Regulators, Product Specification Catalog, 2015, 4 pages, U.S.A.

(Continued)

*Primary Examiner* — Jessica Cahill
(74) *Attorney, Agent, or Firm* — Burns & Levinson LLP; George N. Chaclas

(57) ABSTRACT

A pressure regulator assembly including a regulator valve, a spring guide, a spring extending between the spring guide and regulator valve for setting operation of the regulator valve, a sleeve coupled to the spring guide, a spring cage coupled to the sleeve, an adjustment stem coupled to the sleeve, a dial assembly coupled to the spring cage, and an adjustment cap coupled to the adjustment stem, wherein when the cap is depressed, interaction between the spring cage, spring guide and sleeve causes the spring guide to selectively rotate between a normal mode and a fast-fill mode. In the normal mode, adjustment of the cap determines an output pressure. In the fast-fill mode, the spring is further compressed by movement of the spring guide to a predetermined setting to provide a predetermined output pressure.

11 Claims, 23 Drawing Sheets

(56) References Cited

U.S. PATENT DOCUMENTS

| | | | | |
|---|---|---|---|---|
| 3,955,647 A * | 5/1976 | Tine | ............ | F01M 1/08 |
| | | | | 184/39.1 |
| 4,000,752 A * | 1/1977 | Miller | ............ | F16K 31/143 |
| | | | | 137/118.05 |
| 5,184,739 A * | 2/1993 | Kusz | ............ | A61J 7/04 |
| | | | | 116/308 |
| 6,112,619 A * | 9/2000 | Campbell | ............ | F16K 31/60 |
| | | | | 116/277 |
| 6,691,735 B1 * | 2/2004 | Harneit | ............ | F16K 37/0008 |
| | | | | 137/505 |
| 7,992,527 B2 | 8/2011 | Merwin | | |
| 8,375,991 B2 * | 2/2013 | Erhardt | ............ | F16K 11/0873 |
| | | | | 137/625.47 |
| 9,618,127 B1 * | 4/2017 | Colpan | ............ | F16K 5/10 |
| 9,709,189 B2 * | 7/2017 | Matalon | ............ | F16K 35/027 |
| 2005/0139268 A1 * | 6/2005 | Kremer | ............ | F16K 1/302 |
| | | | | 137/553 |
| 2006/0102236 A1 * | 5/2006 | Phillips | ............ | F16K 37/0008 |
| | | | | 137/557 |
| 2008/0173666 A1 * | 7/2008 | Coe | ............ | B65D 83/0409 |
| | | | | 221/265 |
| 2009/0314360 A1 * | 12/2009 | Checiches | ............ | G05D 16/10 |
| | | | | 137/505 |
| 2016/0120756 A1 * | 5/2016 | Nazginov | ............ | A61J 7/04 |
| | | | | 116/201 |

OTHER PUBLICATIONS

Caleffi North America, Inc., AutoFill pre-adjustable filling units & backflow preventer 553-573 series, Product Specification Catalog, 2012, 4 pages, Milwaukee, WI, U.S.A.

* cited by examiner

BOILER FILL VALVE WITH FAST-FILL AND NON-OSCILATTING DIAL FEATURES

CROSS-REFERENCE TO RELATED APPLICATION

This application claims priority to U.S. Provisional Patent Application No. 62/276,357, filed Jan. 8, 2016, which is incorporated herein by reference.

BACKGROUND OF THE INVENTION

1. Field of the Invention

The subject disclosure relates to pressure regulator valves with fast-fill features and dials that display the normal operation pressure setting.

2. Background of the Related Art

Residential and commercial hydronic heating systems have used boilers for a number of years. The heating systems generally operate by heating boiler water to produce steam, which is then distributed through a piping system to distribute heat to the facility. Once distributed, the resultant steam condenses and returns to the boiler to be heated again and redistributed.

Because of loss and the cycling boiler operation, it is desirable to maintain a consistent water pressure in the system at all times. A typical desirable heating system water pressure is 15 psi in a residential setting. However, typical town water supply pressure is 50 psi. Thus, a pressure regulator is typically installed between the boiler and cold water supply to regulate down the pressure to the desired level.

Upon installation, the boiler intakes a large amount of water. Ideally, the initial fill will take place at an elevated pressure in order to quickly supply the desired amount of water and facilitate purging air from the heating system. To accomplish this quick fill and subsequent pressure regulation, Watts Water Technologies, Inc. of North Andover, Mass. has developed a feed water pressure regulator with a fast-fill/purge lever (Watts Pressure Regulator Model No. 1156F available from Watts Water Technologies, Inc. of North Andover, Mass. or at www.watts.com). The 1156F regulator has a lever that can be moved to an open position that allows maximum flow. Once the boiler is filled, the lever is simply moved to the normal operation position in which the 1156F regulator maintains normal system pressure. The normal system pressure is often set by review of a dial that indicates the pressure setting. The dial is set so that the operator can make an adjustment while reviewing the pressure setting.

SUMMARY OF THE INVENTION

The present disclosure is directed to a pressure regulator assembly with a fast-fill feature to enable efficient filling and purging of the hydronic system. The fast-fill feature is useful when filling the system during new construction, refilling after maintenance has drained some or all of the system, and the like.

The fast-fill feature works by over-riding the normal setpoint (preferably adjustable between approximately 5 PSI to 23 PSI) and sets the valve to a fixed downstream pressure value (preferably 25 PSI). In this way, maximum flow is available to both fill the system rapidly and maximize air purging when the operator cycles the high point vents. Preferably, the pressure regulator assembly still remains functional as a regulator during fast-fill mode, ensuring that the system over-pressure relief valve will not be opened should upstream pressure rise over the boiler relief setpoint (traditionally set at approximately 30 PSI) or should the operator forget to return the valve to normal operation at the conclusion of the filling and venting operation.

In one embodiment, the fast-fill mode may be enabled by placing a hand over a cap and pushing down until a click is heard and/or felt. Such action moves the valve from the current mode (e.g., normal operation) into fast-fill mode and the hand may be removed. Indication that fast-fill mode has been engaged is provided by colored flags that rotate into position to be seen through radial windows in a spring cage (i.e., an upper valve body). To prevent the operator from inadvertently adjusting the normal valve setpoint when in fast-fill mode, cap rotation is prevented by means of interlocking ribs on the cap and spring cage that maintain the cap-to-upper body orientation whenever the cap is depressed.

To return from fast-fill to normal operation, the operator again manually depresses the cap, then releases, which will return the cap to the height before fast-fill was engaged. The colored flags rotate out of alignment view with the windows to signify that the valve has been returned to normal operation. Additionally, the interlocking ribs are cleared, permitting normal cap rotation for downstream pressure adjustment.

The pressure regulator assembly also has an indicator dial that does not oscillate during adjustment. The dial assembly operates by virtue of an inner dial that rotates on an axis offset to the valve centerline or axis. The inner dial diameter is relatively smaller than the cap diameter. By offsetting the inner dial and cap axes, interlocking gear teeth on both the cap and inner dial mesh at a single point. Thus, multiple cap rotations are converted into a single inner dial rotation, thereby adjusting spring preload. A window and pointer on the cap permit the operator to view the relative amount of the spring preload, with a scale calibrated to approximate the corresponding downstream pressure in pound-force per square inch (psi).

As the axes of the cap and dial indicator are not inline, in typical devices, the scale would appear to alternately fill and withdraw from the viewing window opening each time the cap is rotated a full revolution. This wandering radial motion reduces the visibility of the scale numbers. To ensure maximum readability of the dial (e.g., the dial remains steady in the viewing window), the dial indicator has been separated from the gear reduction mechanism and returned to a rotation axis centrally located or in-line with that of the cap. A single pin on the rotor that is captured in a slot on the dial enables the offset gear mechanism to drive the dial, while allowing for the differences in their respective axes.

One embodiment of the subject technology is directed to a pressure regulator assembly including a regulator valve, a spring guide, a spring extending between the spring guide and regulator valve for setting operation of the regulator valve, a sleeve coupled to the spring guide, a spring cage coupled to the sleeve, an adjustment stem coupled to the sleeve, a dial assembly coupled to the spring cage, and an adjustment cap coupled to the adjustment stem, wherein when the cap is depressed, interaction between the spring cage, spring guide and sleeve causes the spring guide to selectively rotate between a normal mode and a fast-fill mode. In the normal mode, adjustment of the cap determines an output pressure. In the fast-fill mode, the spring is further compressed by movement of the spring guide to a predetermined setting to provide a predetermined output pressure.

The adjustment cap has a second set of inner teeth and the spring guide has outer teeth positioned so that when the adjustment cap is depressed, the second set of inner teeth and the outer teeth interact to limit rotation of the adjustment cap. The spring cage can define at least one viewing window and the spring guide has at least one outer surface that selectively aligns with the at least one viewing window to indicate the fast-fill mode of operation does not align with the at least one window to indicate the normal mode. The sleeve may couple to a lower end of the adjustment stem so that as the cap is rotated in normal mode, the adjustment stem moves the sleeve and, in turn, the spring guide moves to vary compression of the spring.

In one embodiment, the spring cage slidably houses the spring guide and the sleeve in axial slots. The spring guide has shoulders with angled top banking surfaces and the spring cage forms inner lands that selectively interact with the shoulders of the spring guide. A bottom of the inner lands forms two cam surfaces and a vertical banking surface that interact with the angled top banking surfaces of the shoulders.

Another embodiment of the subject technology is directed to a dial assembly for a valve having an adjustment stem along an axis. The dial assembly includes a cap having a body with an open end, a closed end, inner teeth, and a socket depending from the closed end for coupling to the adjustment stem so that when the cap is turned, the adjustment stem turns to adjust an output of the valve, wherein the closed end defines a viewing window. A dial rotor has a pin, a gear portion and defining a central opening through which the adjustment stem passes, wherein the dial rotor is rotatably mounted off-axis within the cap so that the gear portion engages the inner teeth so that when the cap is turned, the dial rotor spins albeit at a slower rate than the cap due to gear reduction between the inner teeth and gear portion. A setpoint dial is adjacent the closed end and defining an opening coupled to the pin of the dial rotor, the setpoint dial having numbers selectively aligned with the viewing window to indicate the output of the valve, wherein the setpoint dial is sized and configured so that at least one of the socket and the body substantially center the setpoint dial at all times and the pin moves radially within the slot during rotation of the cap and, in turn, the dial rotor and setpoint dial. A stem washer may mount on the adjustment stem to set a position of the dial rotor thereon.

Still another embodiment is a pressure regulator assembly with a dial assembly. It includes a regulator valve, a spring guide, a spring extending between the spring guide and regulator valve for setting operation of the regulator valve, a sleeve coupled to the spring guide, a spring cage coupled to the sleeve, an adjustment stem coupled to the sleeve, and an adjustment cap coupled to the adjustment stem. When the cap is depressed, interaction between the spring cage, spring guide and sleeve causes the spring guide to selectively rotate between a normal mode and a fast-fill mode. In the normal mode, adjustment of the cap determines an output pressure and in the fast-fill mode, the spring is further compressed by movement of the spring guide to a predetermined setting to provide a predetermined output pressure. The dial assembly includes a cap having a body with an open end, a closed end, inner teeth, and a socket depending from the closed end for coupling to the adjustment stem so that when the cap is turned, the adjustment stem turns to adjust an output of the valve, wherein the closed end defines a viewing window, a dial rotor having a pin, a gear portion and defining a central opening through which the adjustment stem passes, wherein the dial rotor is rotatably mounted off-axis within the cap so that the gear portion engages the inner teeth so that when the cap is turned, the dial rotor spins albeit at a slower rate than the cap due to gear reduction between the inner teeth and gear portion, a setpoint dial adjacent the closed end and defining an opening coupled to the pin of the dial rotor, the setpoint dial having numbers selectively aligned with the viewing window to indicate the output of the valve, wherein the setpoint dial is sized and configured so that at least one of the socket and the body substantially center the setpoint dial at all times and the pin moves radially within the slot during rotation of the cap and, in turn, the dial rotor and setpoint dial, and a stem washer mounted on the adjustment stem to set a position of the dial rotor thereon.

It should be appreciated that the subject technology can be implemented and utilized in numerous ways, including without limitation as a process, an apparatus, a system, a device, a manufacturing process, and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

Figure 1:
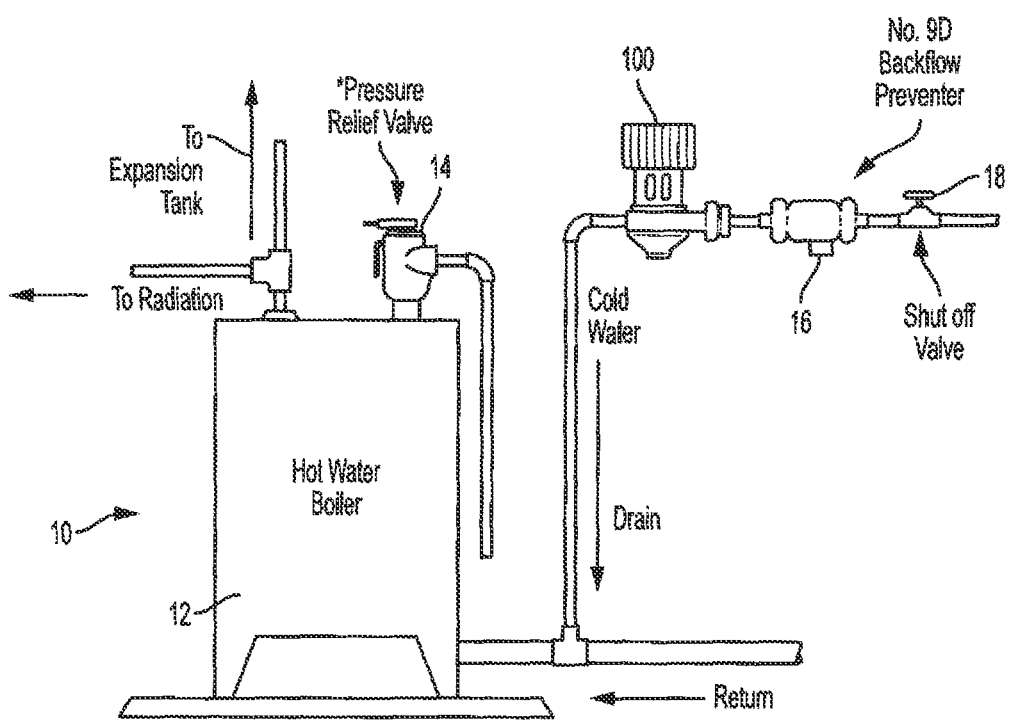
FIG. 1 is a schematic diagram of a heating system in accordance with the subject disclosure.

The subject technology improves upon pressure regulators by providing an easier to operate fast-fill setting and a non-oscillating setpoint dial. The advantages, and other features of the subject technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring now to the FIG. 1, there is shown a schematic diagram of a heating system 10 in accordance with the subject disclosure. The schematic diagram of FIG. 1 includes illustrative information but it is to be appreciated that various common features are omitted for clarity. The heating system 10 includes a pressure regulator assembly 100 between the cold water supply and the hot water boiler 12. The heating system 10 also has other typical components such as a pressure relief valve 14, a backflow preventer 16 and a shut-off valve 18.

During normal operation, the pressure regulator assembly 100 reduces the cold water supply to a desired level for use in the heating system 100. The desired level is user-selected. Upon installation, the pressure regulator assembly 100 is set in fast-fill mode to quickly fill the boiler 12 at an elevated pressure. The pressure regulator assembly 100 includes a boiler fill valve with an adjustment mechanism to control the operation of the boiler fill valve as described below.

Normal Mode and Fast-Fill Mode of Operation

Figure 2:
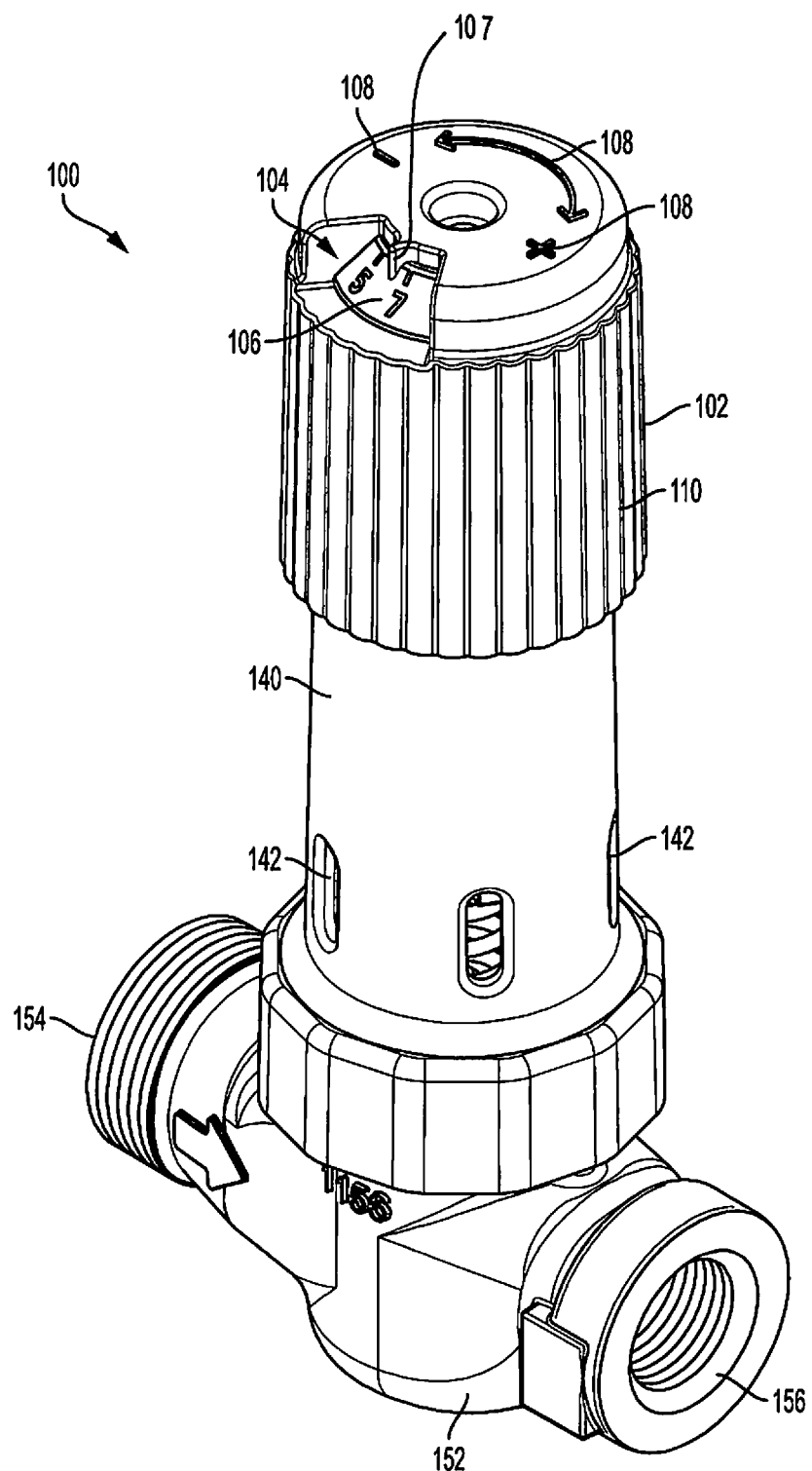
FIG. 2 is a perspective view of a pressure regulator in normal mode in accordance with the subject disclosure.
Figure 3:
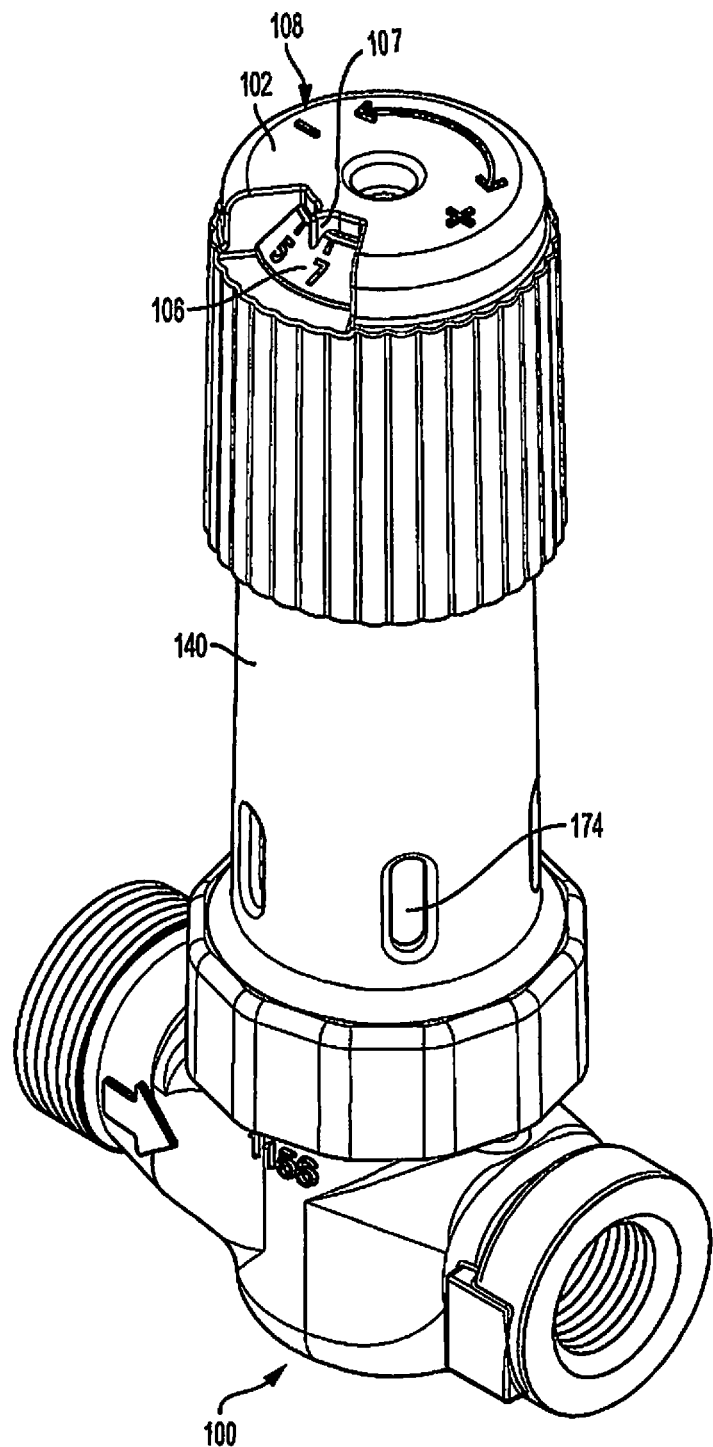
FIG. 3 is a perspective view of the pressure regulator of FIG. 2 in fast-fill mode.

Referring now to FIGS. 2 and 3, perspective views of the pressure regulator assembly 100 in normal mode and fast-fill mode, respectively, are shown. The pressure regulator assembly 100 provides a visual indication as to the current mode of operation. In normal mode, a user can adjust the pressure regulator to provide a desired output, typically water at about 15 psi. The user can toggle out of normal mode into fast-fill mode so that an increased pressure can be used to quickly fill a boiler. Fast-fill mode is useful upon initial installation, during set up, and for maintenance of the hot water boiler 12. Advantageously, once the hot water boiler 12 is filled, the pressure regulator assembly 100 can easily be toggled back into normal mode.

The pressure regulator assembly 100 includes a rotatable cap 102 that forms a window 104 for viewing a setpoint dial 106. Numbers on the setpoint dial 106 indicate the current pressure setting of the regulator 100. To adjust the pressure output up or down, the cap 102 is turned as shown by the indicia 108 thereon. The cap 102 has a textured outer surface 110 to facilitate gripping by the user.

A spring cage 140 forms five windows 142 for visual determination of the mode of operation. The cap 102 mounts on the spring cage 140. A spring guide 170 (see FIG. 4) rotatably mounts within the spring cage 140. The spring guide 170 has five red outer surfaces 175 that selectively align with the windows 142 to indicate fast-fill mode of operation when visible (FIG. 3). When the red outer surfaces 175 do not align with the windows 142, and thus are not visible when the regulator 100 is in normal mode (FIG. 2).

In fast-fill mode, the five red outer surfaces # align with the windows 142. By selection of various parameters as described below, the output pressure setting in fast-fill mode is preselected. In one embodiment, the fast-fill mode pressure output is preset to 23 psi. To toggle between fast-fill and normal mode, the user axially depresses the cap 102 as described in more detail below.

Non-Oscillating Dial in Normal Mode

Still referring to FIGS. 2 and 3, as the cap 102 is rotated in normal mode, the output pressure is adjusted. The user sets the desired pressure by reading the setpoint dial 106 through the window 104 formed in the cap 102. Preferably, the window 104 includes a pointer 107 for making accurate readings. The setpoint dial 106 advantageously rotates in place. As a result, the setpoint dial 106 maintains a consistently easy to view position within the window 104 through the range of pressure adjustments.

Figure 4A:
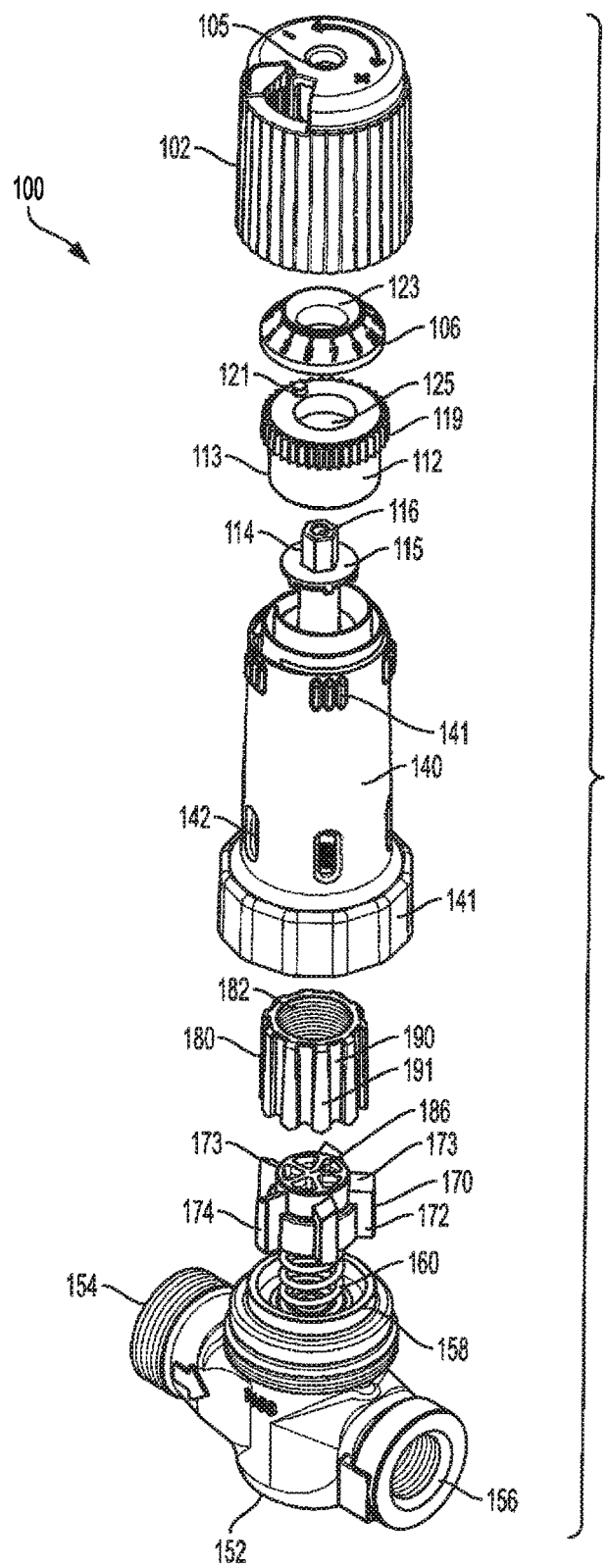
FIG. 4A is an exploded perspective view of a pressure regulator in accordance with the subject disclosure.
Figure 4B:
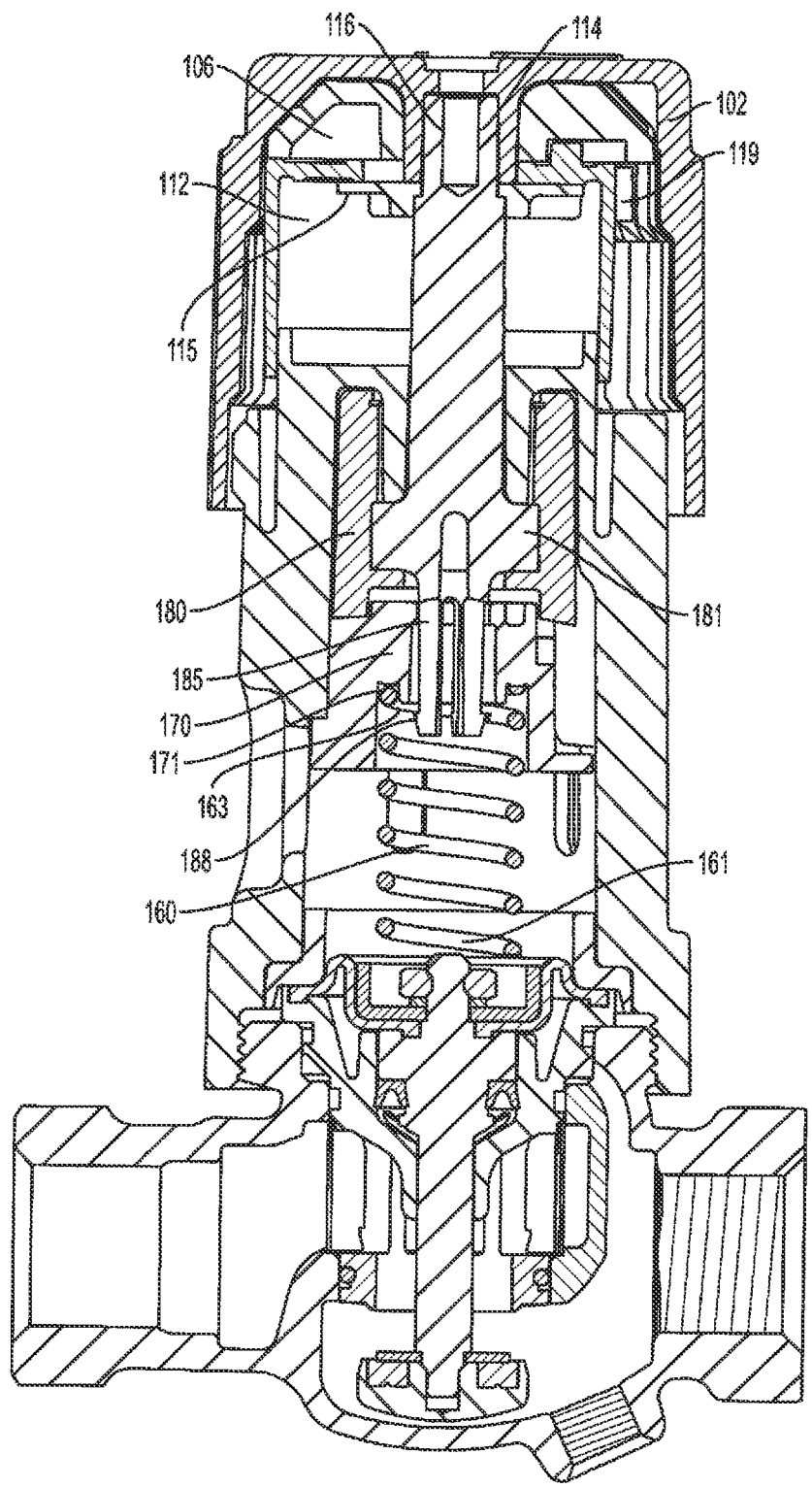
FIG. 4B is a cross-sectional view of a pressure regulator in accordance with the subject disclosure.

Referring to FIGS. 4A and 4B, exploded perspective and cross-sectional views of the pressure regulator assembly 100 are shown. The setpoint dial 106 couples to a dial rotor 112. The setpoint dial 106 and the dial rotor 112 both define central openings 123, 125 through which an adjustment stem 114 passes. A stem washer 115 mounted on the adjustment stem 114 sets a position of the dial rotor 112 on the adjustment stem 114. A top end 116 of the adjustment stem 114 is hexagonal shaped.

Figure 5:
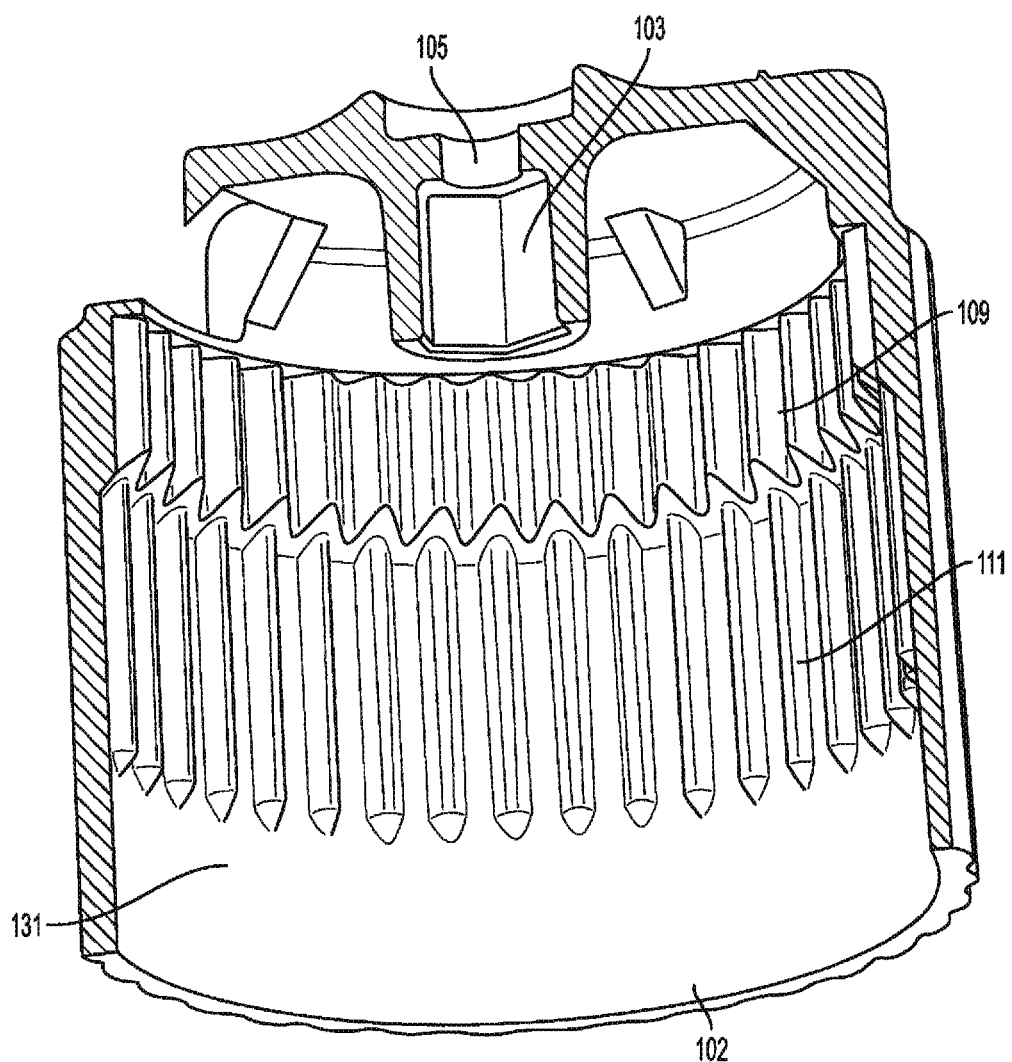
FIG. 5 is partial cut away views of the cap of the pressure regulator in accordance with the subject disclosure.

Referring now to FIG. 5, a partial cut-away view of the cap 102 is shown. The cap 102 forms an inner socket 103 for coupling to the hexagonal top end 116. Additionally, the hexagonal top end 116 defines a threaded hole 117 (FIGS. 6A and 7A) for receiving a screw (not shown) that passes through a screwhole 105 in the cap 102 to retain the hexagonal top end 116 in the inner socket 103. As a result, when the cap 102 is rotated, the adjustment stem 114 also turns to effectively change the pressure setting.

The inner socket 103 also extends through the central opening 123 of the dial 106. In one embodiment, a snug fit between the inner socket 103 and central opening 123 serves to center the dial 106 within the cap 102 so that the pressure numbers on the dial 106 are legible through the window 104 at all times. Alternatively, the outer edge of the dial 106 may fit snugly within the cap 102 so that the pressure numbers are legible through the window 104 at all times.

Figure 6A:
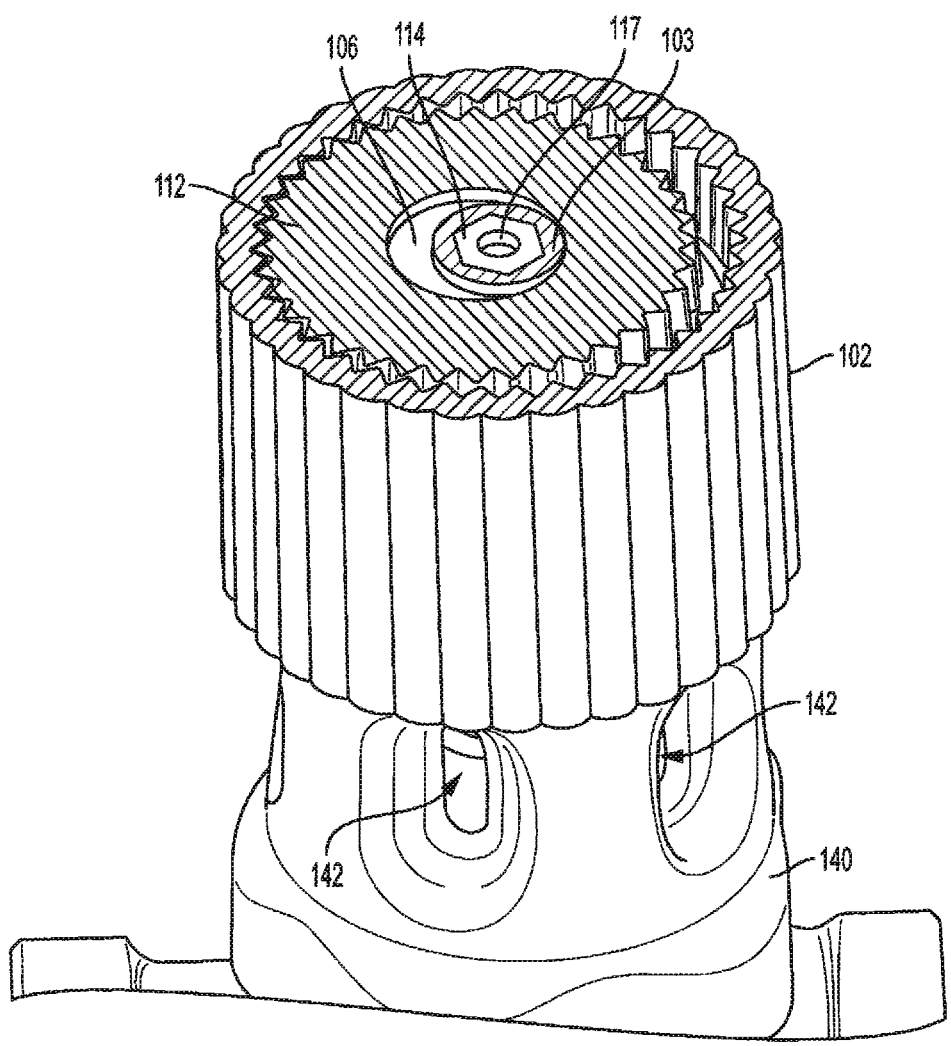
FIGS. 6A and 6B illustrate two different cross-sectional views through the cap in accordance with the subject disclosure.
Figure 6B:
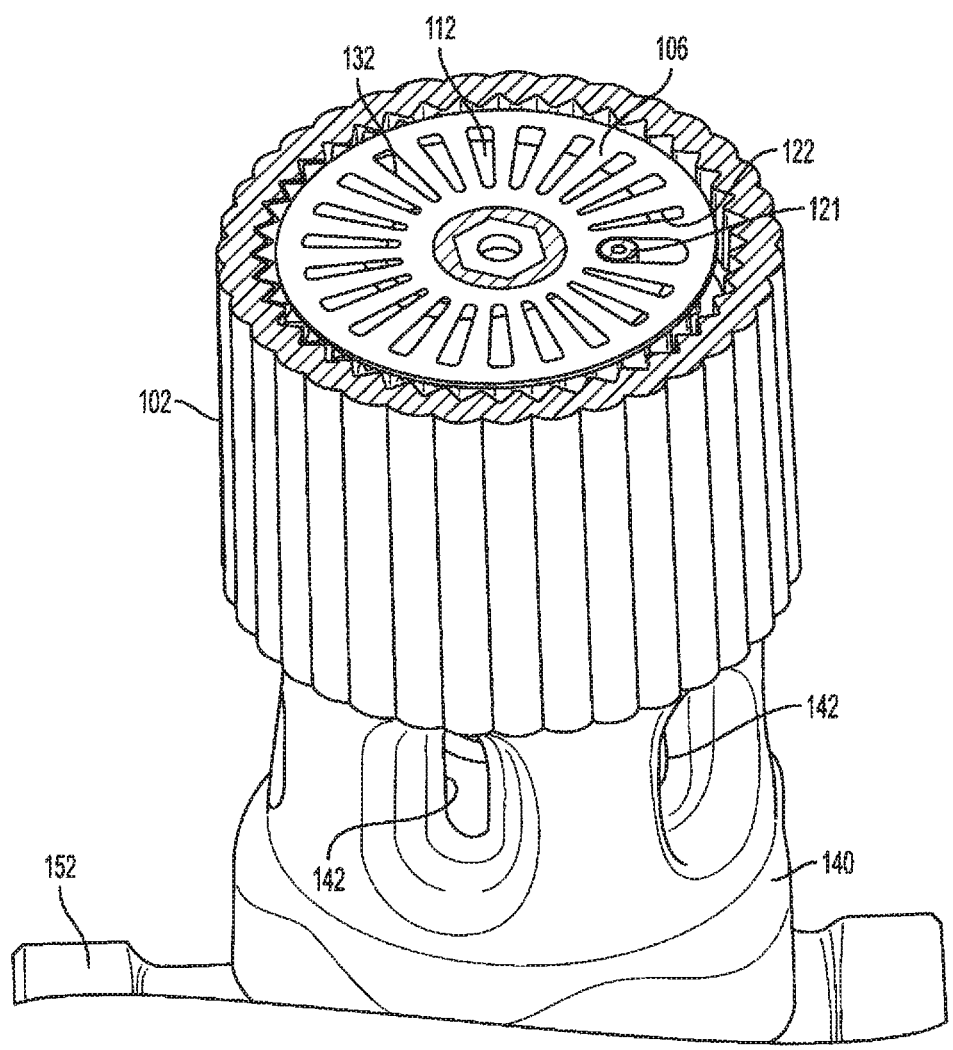
Figure 7A:
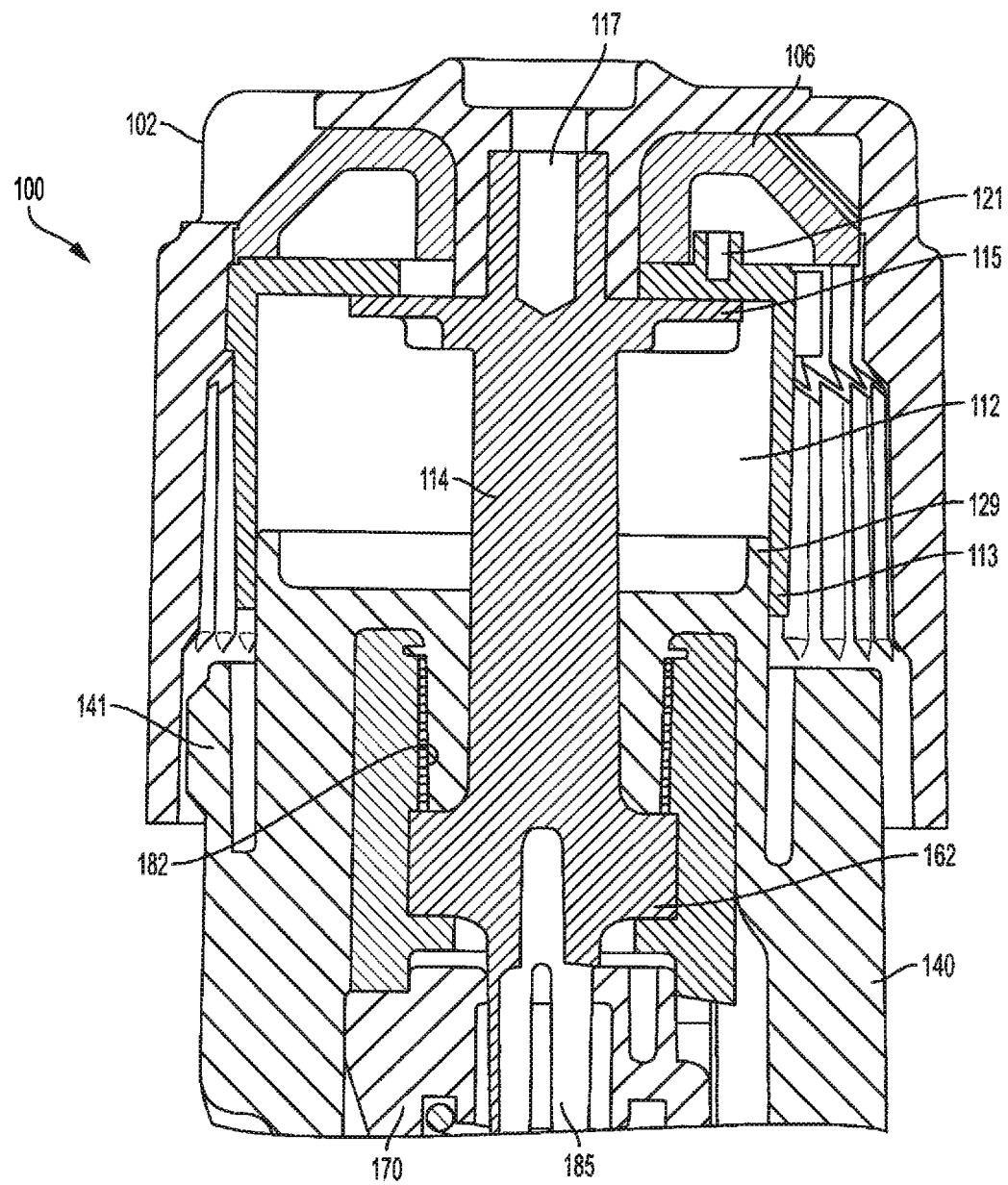
FIGS. 7A-C illustrate cross-sectional views through the cap in accordance with the subject disclosure.

Referring again to FIGS. 4A and 4B, a bottom portion 113 of the dial rotor 112 couples to a circular top frame 129 of the spring cage 140 (see FIG. 7A). The dial rotor 112 is tubular so that the bottom portion 113 of the dial rotor 112 snugly fits on the circular top frame 129. The circular top frame 129 is off-center from the axis so that the dial rotor 112 is similarly off-center, yet the dial rotor 112 effectively couples to the cap 102 as described below with respect to FIGS. 6A and 6B.

Referring now to FIGS. 6A and 6B, two different cross-sectional views through the upper portion of the cap 102 are shown. FIGS. 4A, 4B and 5 are also still being referred to. The cap 102 also forms an upper ring of teeth 109 (best seen in FIG. 5) that couple to a gear portion 119 of the dial rotor 112. The off-axis position of the dial rotor 112 creates the engagement of the teeth 109 and gear portion 119. However, the dial rotor 112 is otherwise free to move within the pressure regulator assembly 100 by resting on the stem washer 115 with the central opening 125 having ample clearance around the adjustment stem 114.

Gear reduction between the teeth 109 and gear portion 119 can be utilized. Preferably, the cap 102 is rotated eight turns for every full turn of the dial rotor 112. An upstanding pin 121 on the dial rotor 112 couples into an oval radial slot 122 in the dial 106 (see FIG. 6B). Thus, the dial 106 turns with the dial rotor 112 but the dial 106 is still free to move in a plane perpendicular to the axis (i.e., the pin 121 slides radially inward and outward within the oval radial slot 122).

Figure 7B:
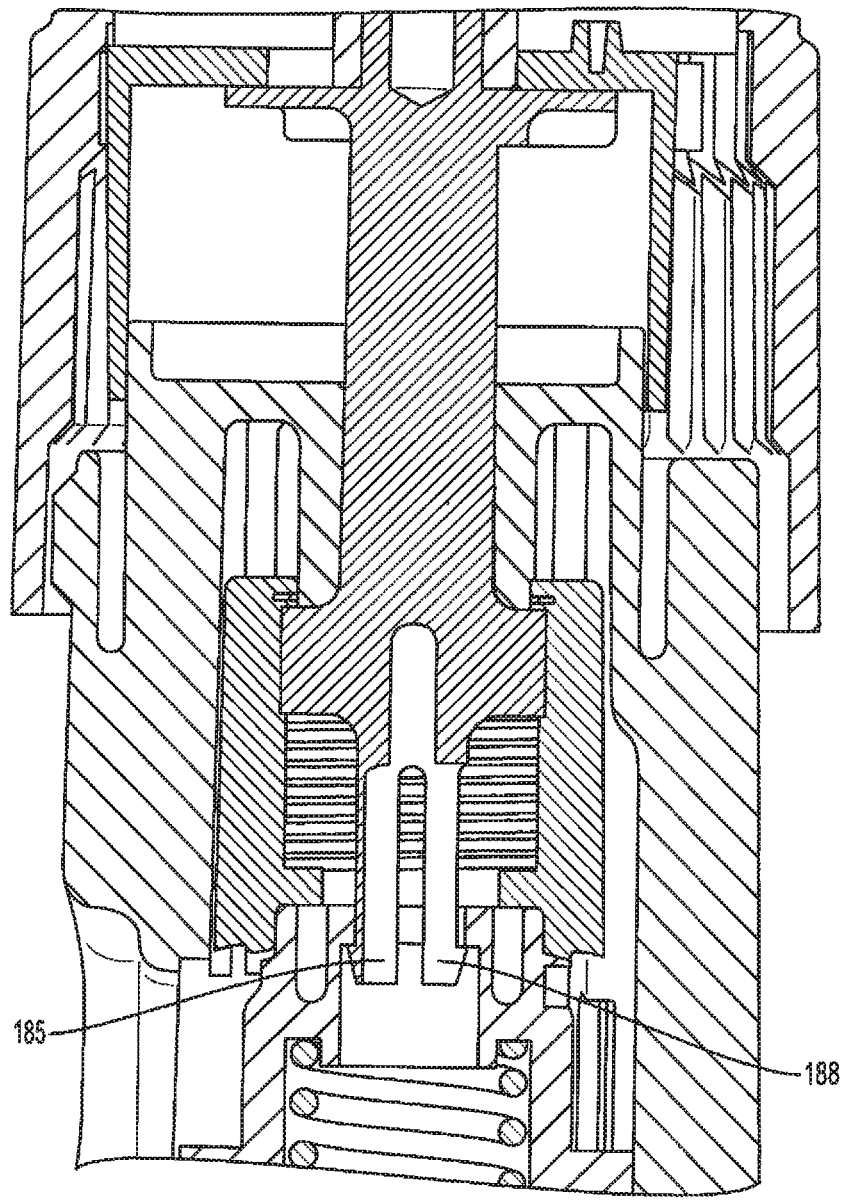
Figure 7C:
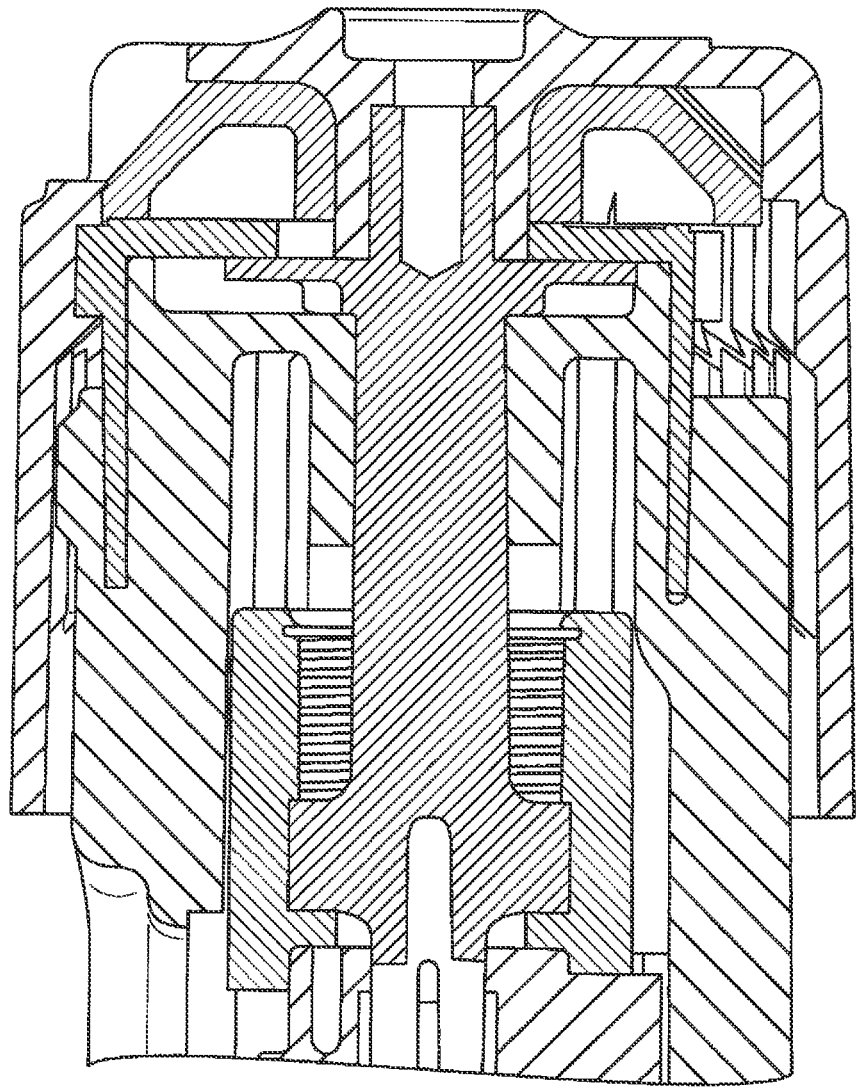
Figure 8A:
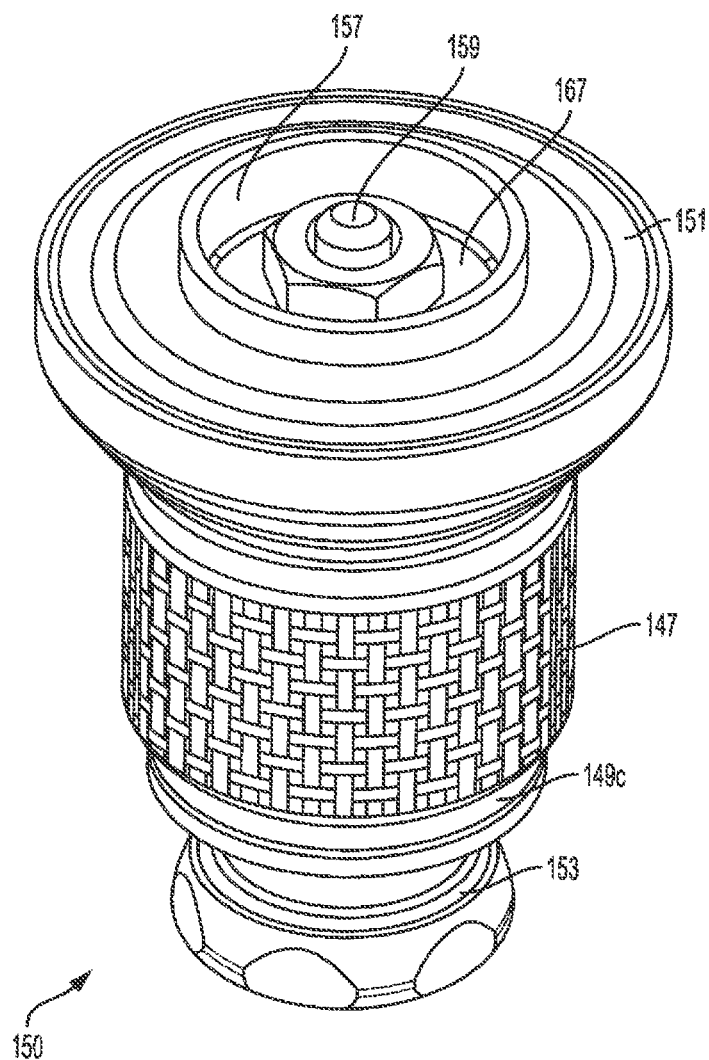
FIGS. 8A and 8B illustrate perspective and cross-sectional views, respectively, of the boiler fill valve in accordance with the subject disclosure.
Figure 8B:
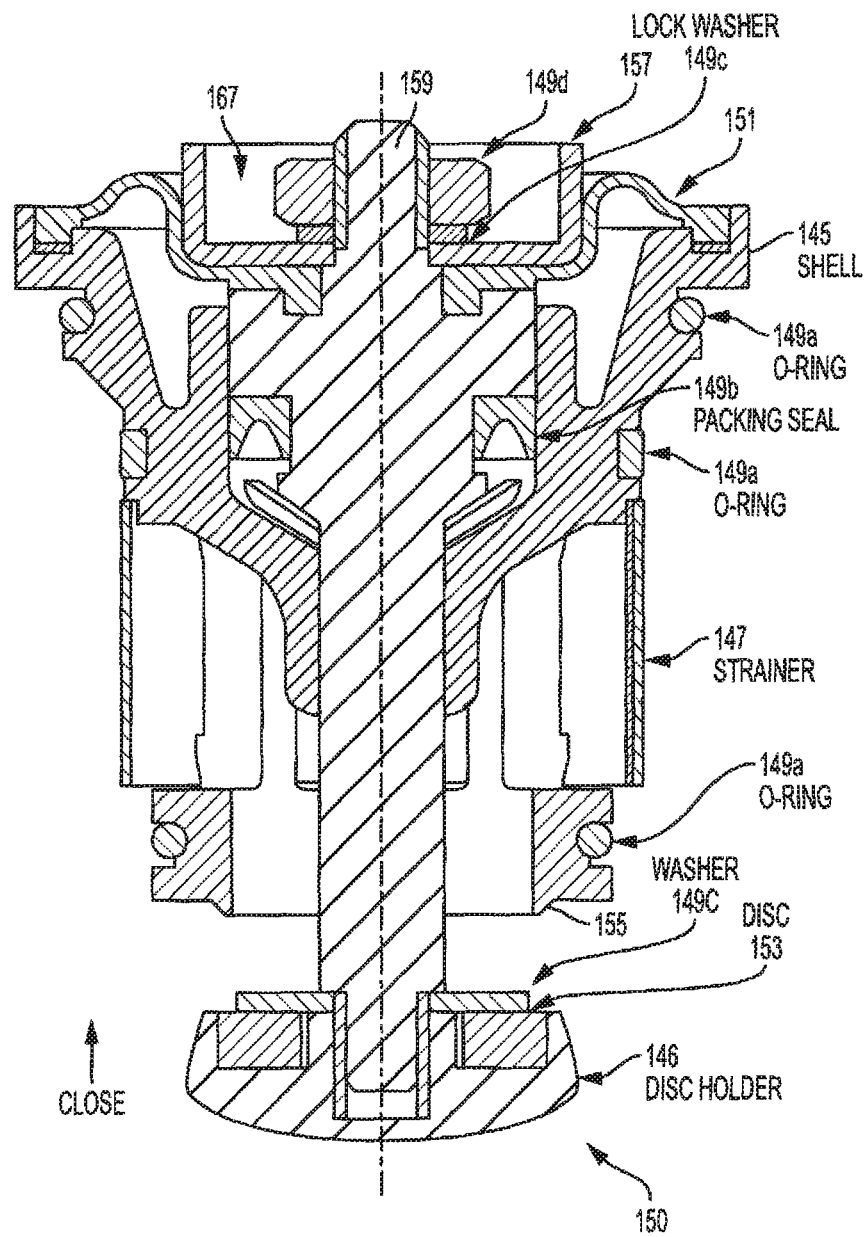

Referring additionally to FIGS. 7A-C, three different cross-sectional views through the cap 102 are shown. As can be seen, when assembled, the dial rotor 112 rests on the stem washer 115, which is biased upward. When the cap 102 is rotated, the dial rotor 112 and, in turn, the dial 106 will turn albeit only a fraction as much. By virtue of the hex top end 116 being in the inner socket 103, turning the cap 102 also turns the adjustment stem 114. The adjustment stem 114 will turn as much as the cap 102 to set the pressure as desired according to the dial reading as described in more detail below. The dial 106 in the window 104 provides a reading of the set pressure.

Referring now to FIGS. 4A, 4B, 8A and 8B, several views of a boiler fill valve 150 are shown. The boiler fill valve 150 is retained in a housing 152 with an inlet 154 and an outlet 156. Typically, the inlet 154 is supplied from a public source at about 50 psi whereas the outlet 156 provides water at a pressure of about 15 psi for home use. The spring cage 140 threads onto a top opening 158 of the housing 152 and helps provide adjustment to the boiler fill valve 150 when the cap 102 is turned.

In a preferred embodiment, the boiler fill valve 150 is a reverse-seated, direct-acting regulator inside the housing 152. The boiler fill valve 150 utilizes downstream pressure applied below a diaphragm 151 coupled to the valve stem 114 in order to provide closing motive force to overcome both upstream pressure and pressure of a preload spring 160 (see FIG. 4). When downstream pressure rises sufficiently, the resulting force imbalance closes the boiler fill valve 150 by pushing a disc 153 tight against a seat 155, shutting off flow as shown by the arrow on FIG. 8B. A slip ring or plate 157 fits over the diaphragm 151 to help maintain the diaphragm 151 properly assembled.

The preload spring 160 extends between the boiler fill valve 150 and the spring cage 140. Referring additionally to FIGS. 4A and 4B, a bottom end 161 of the preload spring 160 seats in an annular groove 167 formed by the plate 157 of the boiler fill valve 150. Altering the preload of the preload spring 160 (FIG. 4), and thus the resulting downstream pressure setpoint, is accomplished by adjusting the valve cap 102 as will be described in more detail below. As noted above, the cap 102 is equipped with a gear-reduction system that converts the cap rotation into a reading on a numbered display dial 106, which corresponds to downstream pressure in PSI. In this manner, the dial reading assists the operator in setting the desired boiler inlet pressure without the need for additional gauges to be installed between the regulator and boiler.

The boiler fill valve 150 also includes a shell 145 with a depending strainer 147 that enclose the other components. The valve stem 159 terminates in a disc holder 146 for retaining the disc 153. Several sealing rings 149a, a packing seals 149b, washers 149c and a nut 149d help complete the boiler fill valve 150.

Figure 9A:
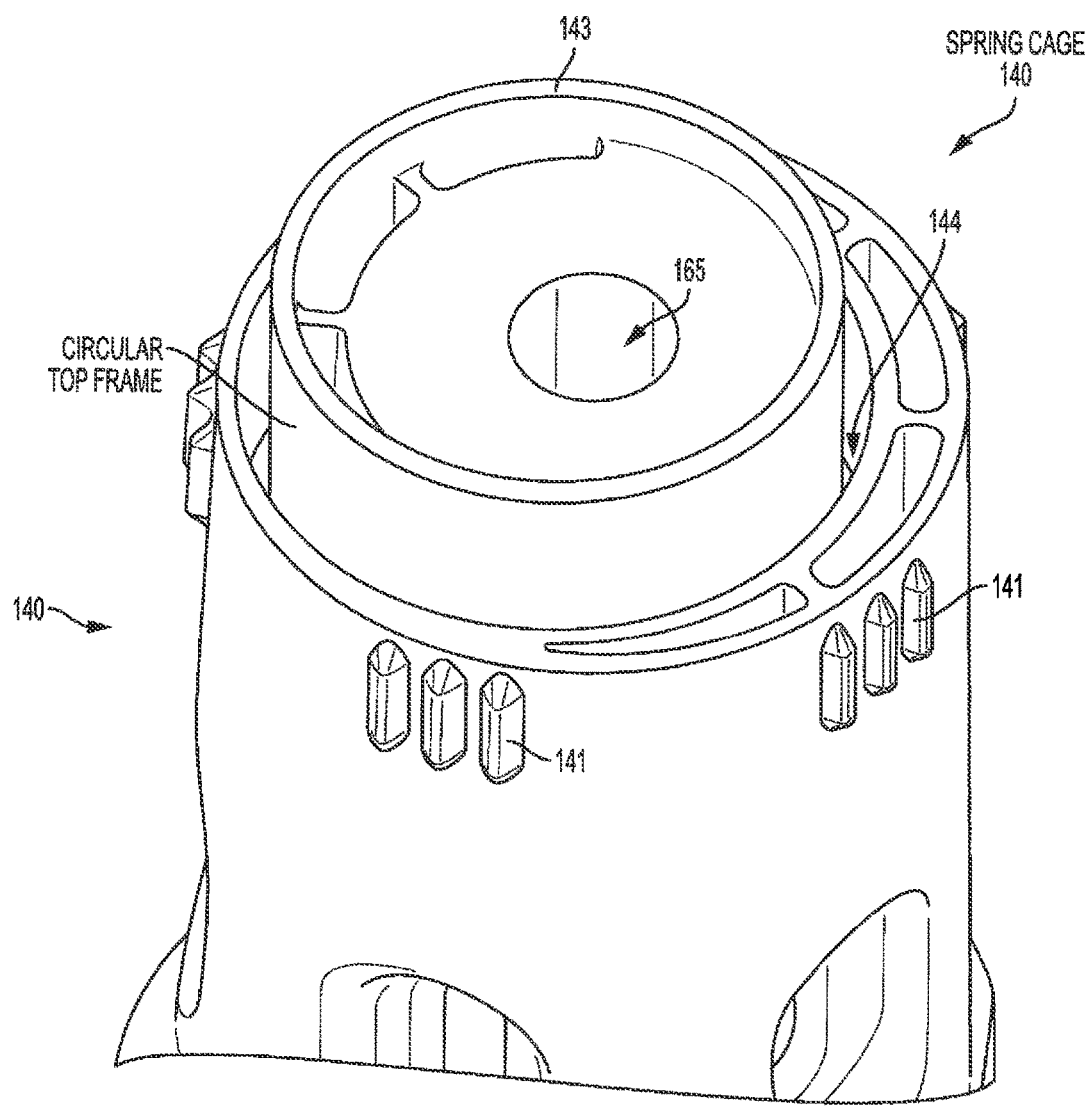
FIGS. 9A and 9B illustrate perspective and cross-sectional views, respectively, of the spring cage of the pressure regulator assembly in accordance with the subject disclosure.
Figure 9B:
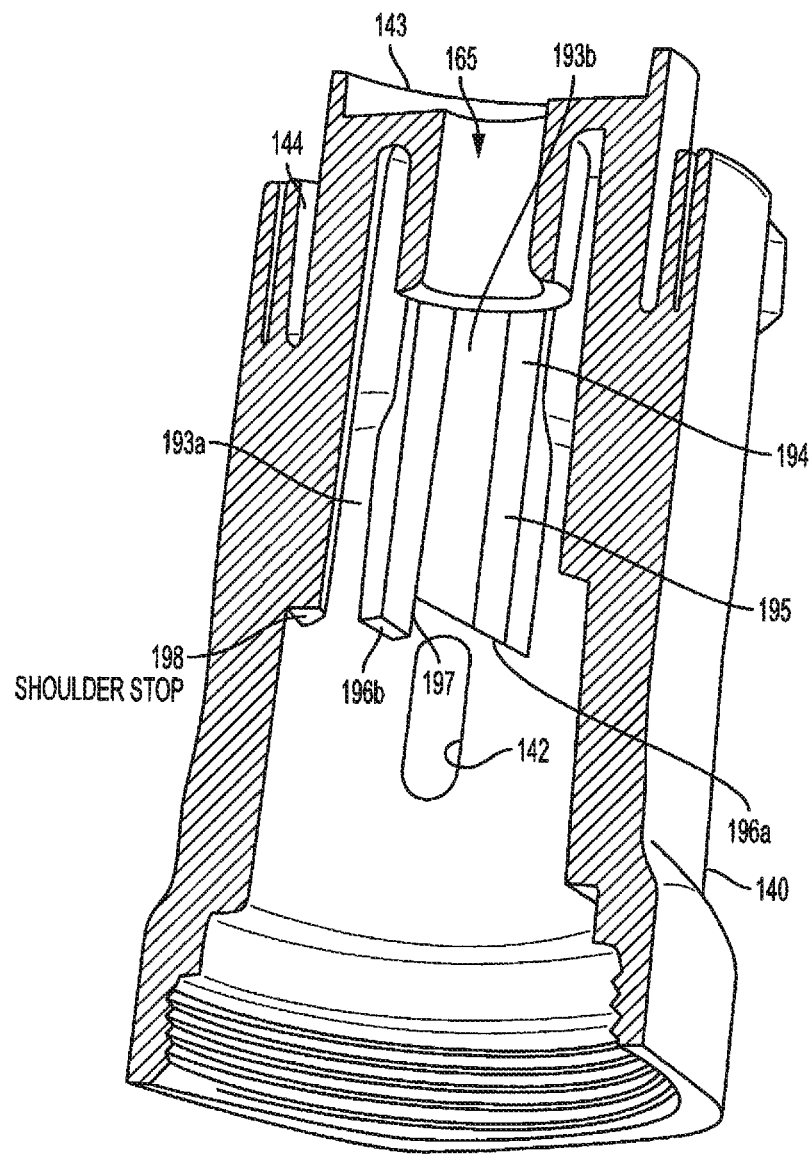

Referring to FIGS. 9A and 9B, a cross-sectional and top perspective view of the spring cage 140 of the pressure regulator assembly 100 are illustrated, respectively. In addition to coupling to the cap 102, the dial rotor 112, and the valve housing 152 as noted above, the spring cage 140 houses a portion of the preload spring 160.

Referring additionally to FIGS. 4A and 4B, a top end 163 of the preload spring 160 seats against a spring guide 170. In particular, the spring guide 170 forms a hollow 171 that captures the top end 163 of the preload spring 160. The spring guide 170 abuts and interacts with a sleeve. The spring cage 140 slidably houses the spring guide 170 and the sleeve 180 to facilitate switching between normal and fast-fill mode. The sleeve 180 threadably couples to a lower end 181 of the adjustment stem 114 so that the preload spring 160 provides force to bias the adjustment stem 114 upward. The spring cage 140 slidably houses the spring guide 170 and the sleeve 180 in slots 193a, 193b (see FIG. 9B).

Referring to FIGS. 4A, 4B, 9A and 9B, the spring cage 140 and the cap 102 are rotationally keyed together so that as the cap 102 moves up and down along the axis to toggle between modes, the cap 102 does not rotate about the axis. Thus, the normal mode setting is not accidentally changed when in fast-fill mode. In the shown embodiment, the cap 102 has a second set of inner teeth 111 (see FIG. 5) that engage five sets of outer teeth 141 on the spring cage 140 (FIGS. 4A and 9A). Each set of teeth 141 preferably is three teeth.

A bottom portion 113 of the dial rotor 112 also slides axially along the circular top frame 143 of the spring cage 140 into a groove 144 when the cap 102 is depressed. In the normal mode, the outer teeth 141 align with a toothless inner region 131 of the cap 102 (see FIGS. 5 and 10A). Thus, in normal mode, the cap 102 can be rotated for adjustment of the output pressure as described in more detail below.

The spring cage 140 also defines a central axial opening 165. The adjustment stem 114 slides axially in the central axial opening 165 when the cap 102 is toggled between modes. Additionally, the adjustment stem 114 rotates within the central axial opening 165 when the cap 102 is rotated to set the output pressure.

Referring now to FIGS. 4A, 4B and 7A-C, the adjustment stem 114 has a threaded intermediate collar 162 that screws into a threaded hole 182 in the sleeve 180. Thus, as the cap 102 is rotated, the adjustment stem 114 turns because of the top end 116 coupling in the inner socket 103 of the cap 102. In turn, the sleeve 180 moves up and down within the spring cage 140 on the threaded intermediate collar 162 to vary the compression of the preload spring 160.

In one embodiment, a snap ring acts as a mechanical stop so that the adjustment stem 114 cannot unscrew from the threaded hole 182 once assembled. Preferably, the threaded intermediate collar 162 and threaded hole 182 are reverse threaded as described in more detail below.

A lower end 185 of the adjustment stem 114 passes through a central bore 186 in the spring guide 170. The lower end 185 includes an enlarged distal end 188 (see FIG. 7B) and is slotted so that the lower end 185 can pass through the central bore 186 during assembly yet still fit snugly. The enlarged distal end 188 helps retain the spring guide 170 and adjustment stem 114 together during assembly.

The sleeve 180 is also keyed to the spring cage 140 so that the sleeve 180 does not rotate about the axis. The sleeve 180 forms a plurality of alternating outer axial channels 190 intermediate ridges 191 (see FIG. 4A). The ridges 191 axially slide within slots 193a, 193b formed on the inner surface 194 of the spring cage 140 (FIG. 9B) to prevent the rotation of the sleeve 180. It is noted that slots 193a are radially deeper that slots 193b.

As best seen in FIG. 4B, the preload spring 160 extending between the plate 157 and the spring guide 170 applies downward force on the boiler fill valve stem 159 so that the boiler fill valve 150 is normally open. At the same time, the preload spring 160 pushes upward against the spring guide 170, which in turn pushes upward against the sleeve 180. Thus, when the adjustment stem 114 is rotated by rotation of the cap 102, the position of the sleeve 180 changes to either compress or decompress the preload spring 160 to determine the output setting of the pressure regulator assembly 100. In other words, during normal mode, less compression of the preload spring 160 means a lower output pressure (FIG. 7B) and more compression of the preload spring 160 means a higher output pressure (FIG. 7A). The spring cage 140 forms a shoulder stop 198 that sets an upper travel limit on the spring guide 170 (FIG. 9B).

Features for Toggling between Fast-Fill and Normal Mode

Referring again to FIGS. 4A, 4B, 9A and 9B, interaction between the spring cage 140, spring guide 170 and sleeve 180 causes the spring guide 170 to selectively rotate when the cap 102 is depressed enough to overcome the force of the preload spring 160. The spring guide 170 has five shoulders 172 with angled top banking surfaces 173. The shoulders 172 are equally spaced and colored red on the outer surface 174. This red outer surface 174 is visible through the windows 142 of the spring cage 140 to visually indicate fast-fill mode. When this red outer surface 174 is not visible through the windows 142, the pressure regulator valve assembly 100 is in normal mode. Alternatively, the windows 142 of the spring cage 140 could be differently aligned so that the shoulders are seen in the normal mode and, for example, colored green to indicate normal mode.

To interact with the banking surfaces 173 of the spring guide 170, the spring cage 140 forms five inner lands 195 that selectively interact with the five shoulders 172 of the spring guide 170. The inner lands 195 also form every other slot 193b in which the ridges 191 of the sleeve 180 slide. The bottom of the inner lands 195 forms two cam surfaces 196a, 196b and a vertical banking surface 197 that interact with the angled top banking surfaces 173 of the shoulders 172.

The first cam surfaces 196a are at a complimentary angle so that as the spring guide 170 slides towards the cap 102, the corresponding angled top banking surfaces 173 engage the first cam surfaces 196a creating a force to rotate the spring guide 170 in a clockwise direction about the axis when viewed from above the cap 102. The spring guide 170 will rotate until sidewalls 189 of the shoulders 172 contact the banking surface 197. At this point, the spring guide 170 will be prevented from sliding further upward or rotating and the red outer surface 174 is aligned with the window (e.g., the fast-fill position). The spring guide 170 is captured in the fast-fill position because the force of the preload spring 160 keeps the spring guide 170 up against the inner lands 195. As the inner lands 195 limit the upward travel of the spring guide 170, the preload spring 160 is compressed. As a result, the boiler fill valve 150 is pushed open into the fast-fill position.

The sleeve 180 also interacts with the banking surfaces 173 of the spring guide 170 to toggle into the operational mode. The sleeve 180 includes lower cam surfaces 200 to interact with the angled top banking surfaces 173 of the shoulders 172.

To toggle from fast-fill to normal mode, the cap 102 is pressed downward to overcome the force of the preload spring 160. As a result, the adjustment stem 114 and, thereby, the sleeve 180 slide downward. The sleeve 180 travels downward in the slots 193a, 193b formed by the spring cage lands 195. The spring guide 170 also travels downward. However, initially, the spring guide shoulders 172 are against the banking surfaces 197 to prevent rotation of the spring guide 170. But as the spring guide 170 moves downward past the banking surface 197, the spring guide 170 becomes free to rotate. The complimentary angles of the sleeve cam surfaces 200 and the shoulder banking surfaces 173 create a rotational force to urge the spring guide 170 clockwise.

Once the spring guide 170 rotates and the pressure on the cap 102 is released, the spring force moves the spring guide 170 and sleeve 170 upward. As the spring guide 170 slides towards the cap 102 (e.g., upward), the angled top banking surfaces 173 hit the second cam surfaces 196b of the inner lands 195. This generates additional clockwise rotation of the spring guide 170 so that the five shoulders 172 align with the five slots 193a intermediate the inner lands 195 and slide further upwards to decompress the spring 160 (e.g., a normal position). As such, the spring guide 170 is urged against the sleeve 180 and free to slide (e.g., normal mode). When the cap 102 is turned for adjustment, the adjustment stem 114 moves the sleeve 180 along the threads up or down. In turn, the spring guide 170 moves to vary the compression of the preload spring 160 to vary the output of the boiler fill valve 150.

To toggle from normal to fast-fill mode, the cap 102 is again pressed downward to overcome the force of the preload spring 160. The adjustment stem 114, the sleeve 180, and the spring guide 170 slide downward together. The complimentary angles of the sleeve cam surfaces 200 and shoulder banking surfaces 173 create a rotational force to urge the spring guide 170 clockwise. Initially, the shoulders 172 are in the slots 193a to prevent rotation of the spring guide 170 but as the spring guide 170 moves downward out of the slots 193a the spring guide 170 rotates.

Once the spring guide 170 rotates and the pressure on the cap 102 is released, the spring force moves the spring guide 170 and sleeve 170 upward. As the spring guide 170 slides towards the cap 102 (e.g., upward), the angled top banking surfaces 173 hit the second cam surfaces 196b of the inner lands 195. This generates additional clockwise rotation of the spring guide 170 so that the five shoulders 172 come against the vertical banking surfaces 197 (i.e., rest in the fast-fill position with the spring 160 compressed). During toggling between modes, the cap inner teeth 111 engage the spring cage outer teeth 141 to prevent rotation of the cap 102 so that adjustment of the normal mode pressure does not inadvertently occur.

Normal Adjustment of the Output Pressure

Figure 10A:
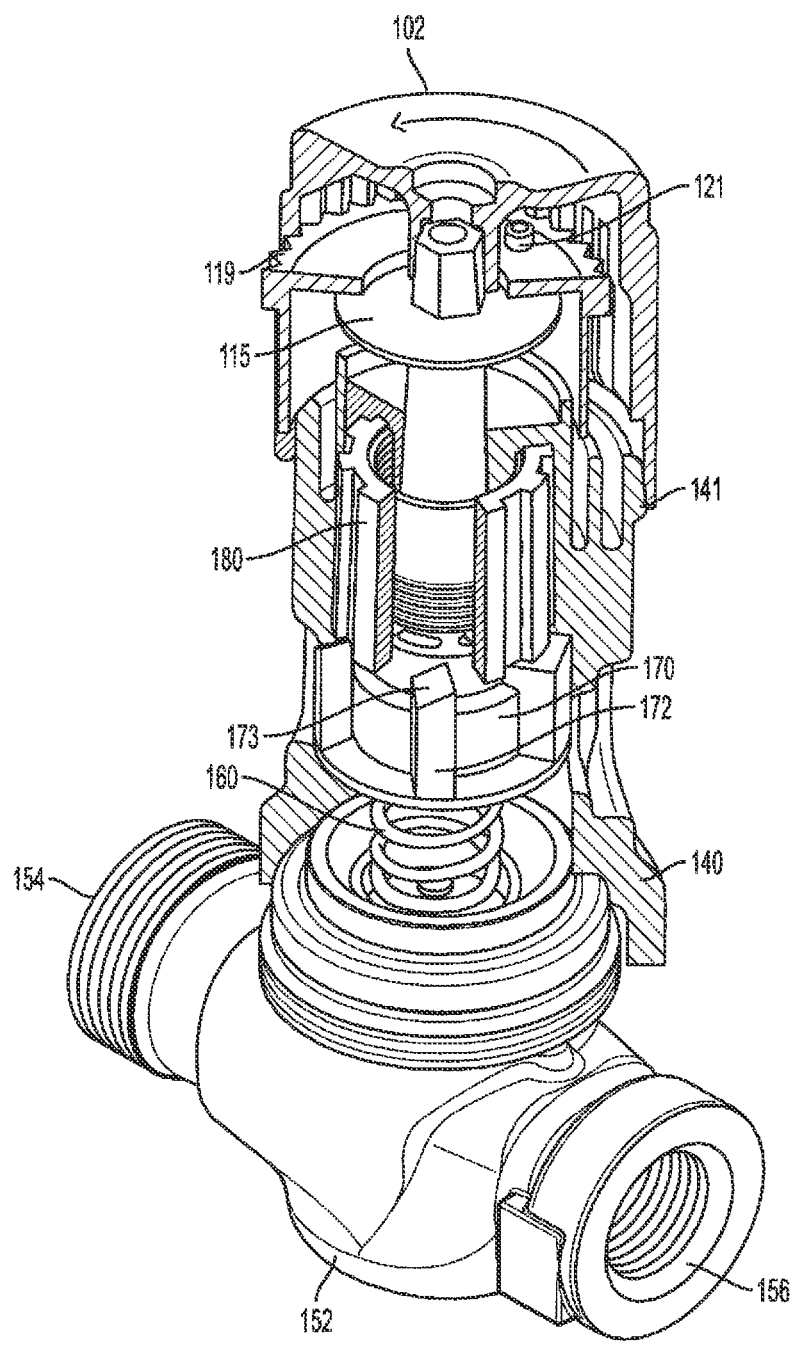
FIGS. 10A and 10B illustrate different partial cut-away views of the pressure regulator assembly at a low pressure setting in normal mode in accordance with the subject disclosure.
Figure 10B:
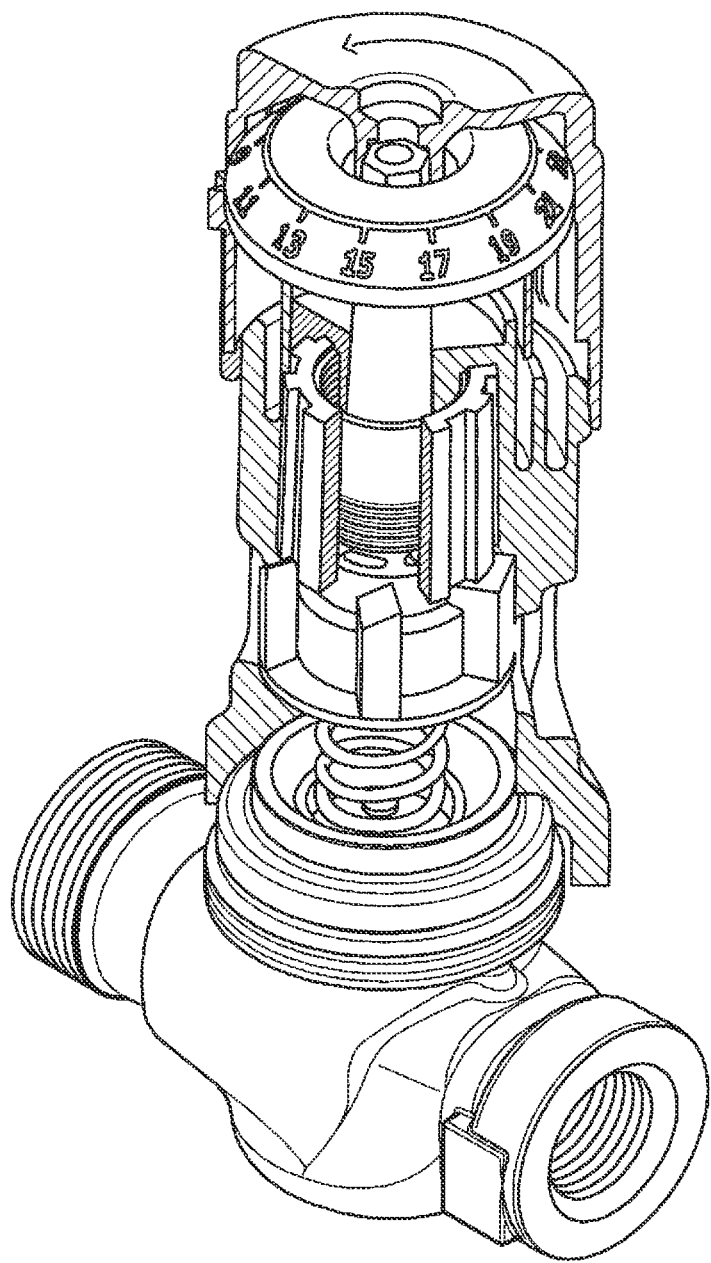

Referring now to FIGS. 10A and 10B, different partial cut-away views of the pressure regulator assembly 100 at a low pressure setting in normal mode are illustrated. As can be seen, the cap 102 and thereby the adjustment stem 114 has been turned counter-clockwise so that the sleeve 180 has been pulled upward due to the reverse threading of the adjustment stem 114 and sleeve 180. The force of the preload spring 160 has pushed the spring guide 170 upward along with the upward movement of the sleeve 180. Thus, the preload spring 160 is relatively less compressed, which results in less force applied on the plate 157 of the boiler fill valve 150. Hence, the output pressure is a low or minimal setting.

Figure 11A:
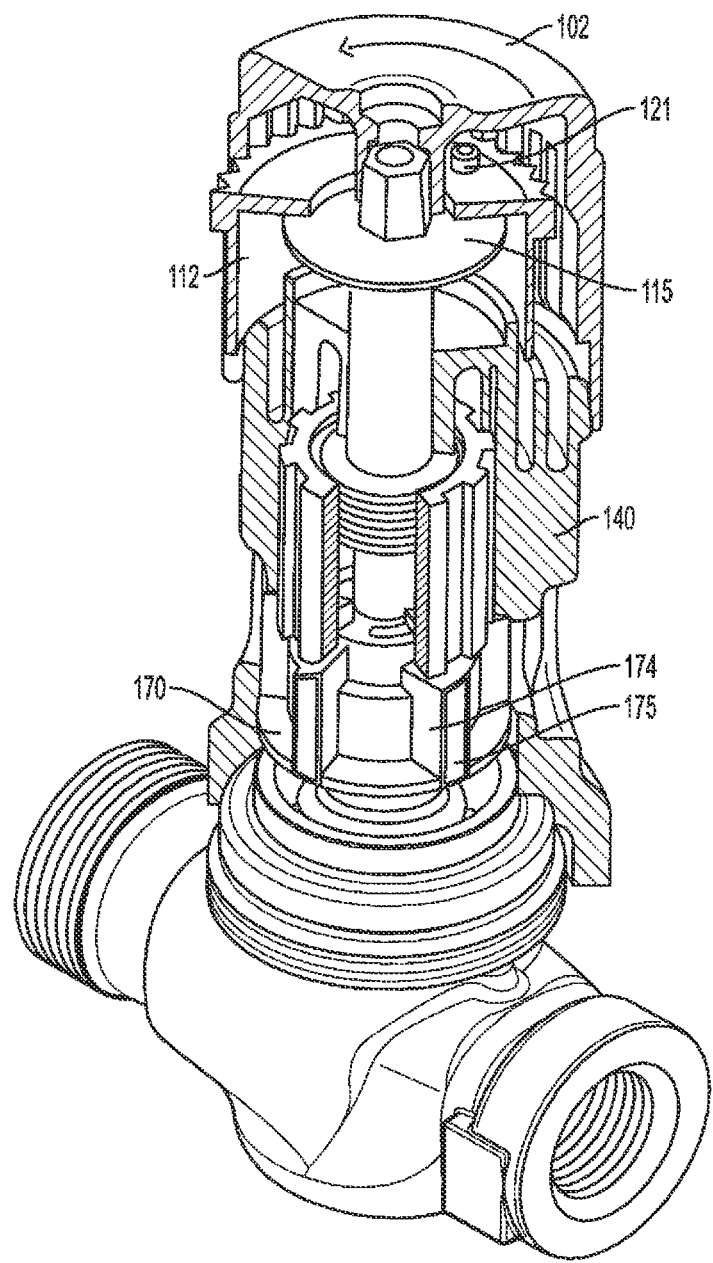
FIGS. 11A and 11B illustrate different partial cut-away views of the pressure regulator assembly at a high pressure setting in normal mode in accordance with the subject disclosure.
Figure 11B:
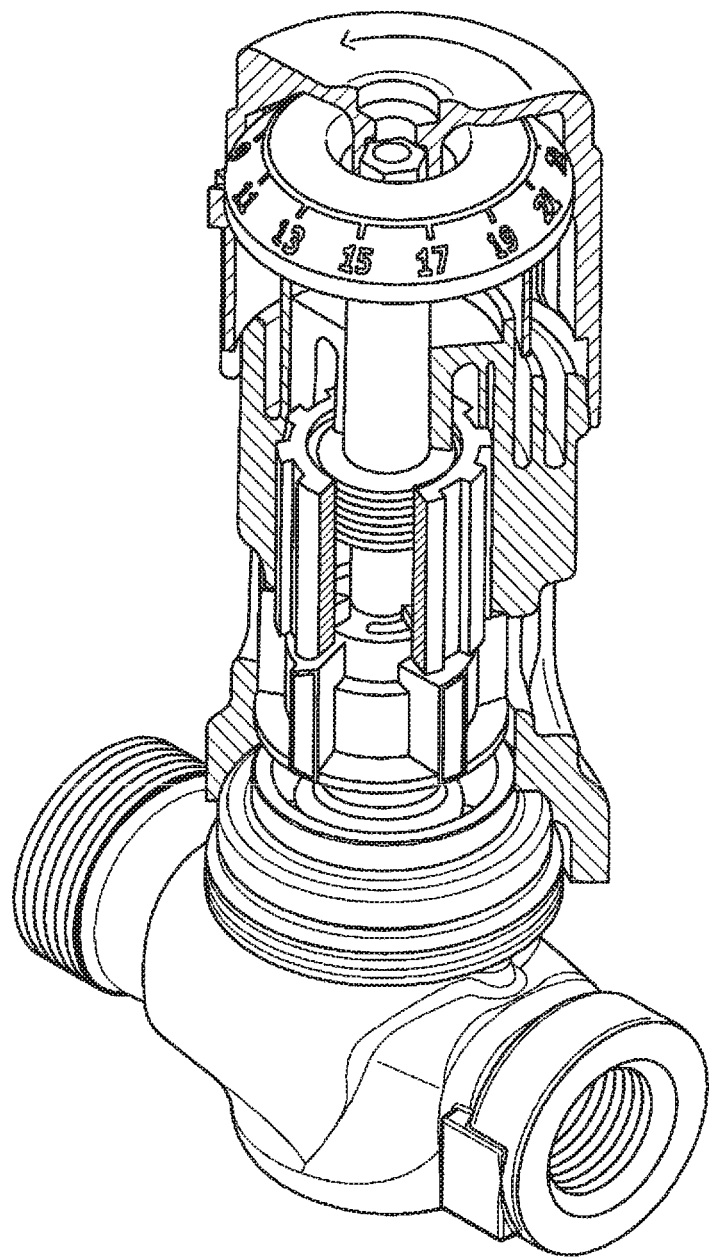

Referring now to FIGS. 11A and 11B, different partial cut-away views of the pressure regulator assembly at a high pressure setting in normal mode are illustrated. The cap 102 and thereby the adjustment stem 114 has been turned to a clockwise maximum (preferably, the sleeve 180 is against a spring clip as a mechanical stop) so that the sleeve 180 has been moved downward. Thus, the spring guide 170 has been moved downward along with the downward movement of the sleeve 180. As a result, the preload spring 160 is relatively more compressed, which results in more force applied on the plate 157 of the boiler fill valve 150. Hence, the output pressure is at a high or maximum setting. In one embodiment, the maximum output pressure setting is approximately 23 psi.

Fast-Fill Mode

Figure 12A:
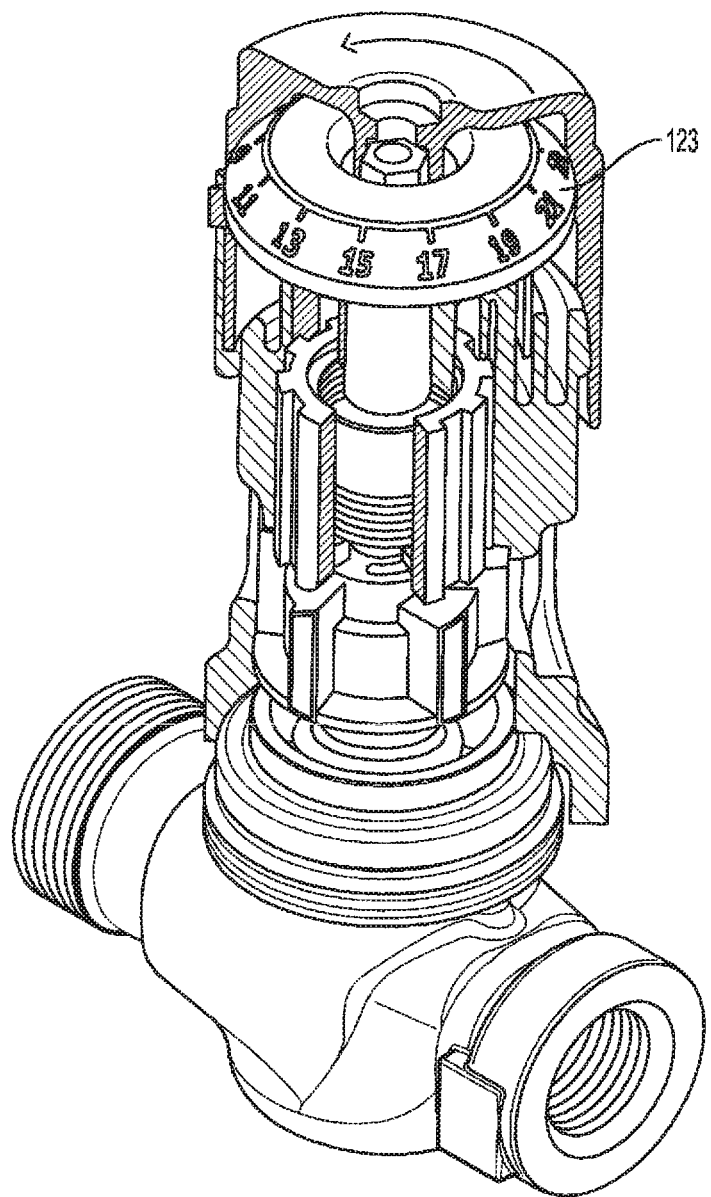
FIGS. 12A and 12B illustrate different partial cut-away views of the pressure regulator assembly in fast-fill mode in accordance with the subject disclosure.
Figure 12B:
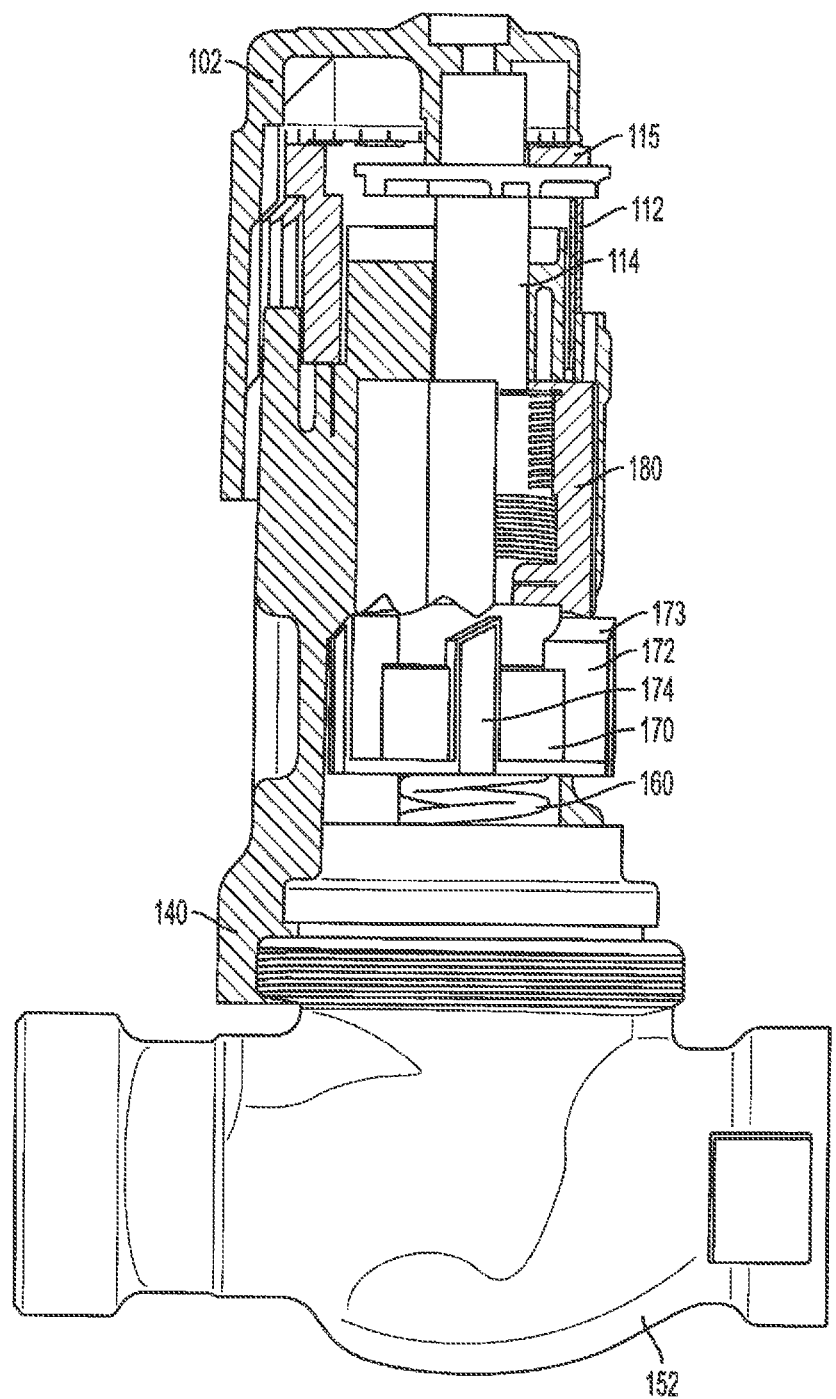

Referring to FIGS. 12A and 12B, different partial cutaway views of the pressure regulator assembly 100 in fast-fill mode are illustrated. In FIGS. 10A-12B, it is noted that only FIG. 12A includes the dial 123 for illustrative purposes. The spring guide 170 has been rotated into position so that the shoulders 172 securely rest against the cam surfaces 196a, 196b of the spring cage 140 because of force from the preload spring 160. As such, the spring 160 is compressed in a predetermined manner to set the output pressure at a predetermined value. The preload spring 160 selection is one of the parameters to set the predetermined value along with the location and shape of the various banking surface, boiler fill valve design and other factors as would be appreciated by those of ordinary skill in the art after review of this disclosure. In one embodiment, the fast-fill mode provides an output flow at 25 psi so that the boiler may be quickly filled. The cap inner teeth 111 engage the spring cage outer teeth 141 so that adjustment of the normal mode pressure does not inadvertently occur when in fast-fill mode.

Of note, the pressure regulator valve 100 still remains functional as a regulator during this fast-fill mode, ensuring that the system over-pressure relief valve will not be opened should upstream pressure rise over the boiler relief setpoint (traditionally set at approximately 30 PSI) or should the operator forget to return the pressure regulator assembly 100 to normal mode at the conclusion of the filling and venting. The subject technology is applicable to any type of system. For example, the subject technology would work equally as well in a steam type system, a hydronic type system and the like.

Figure 13:
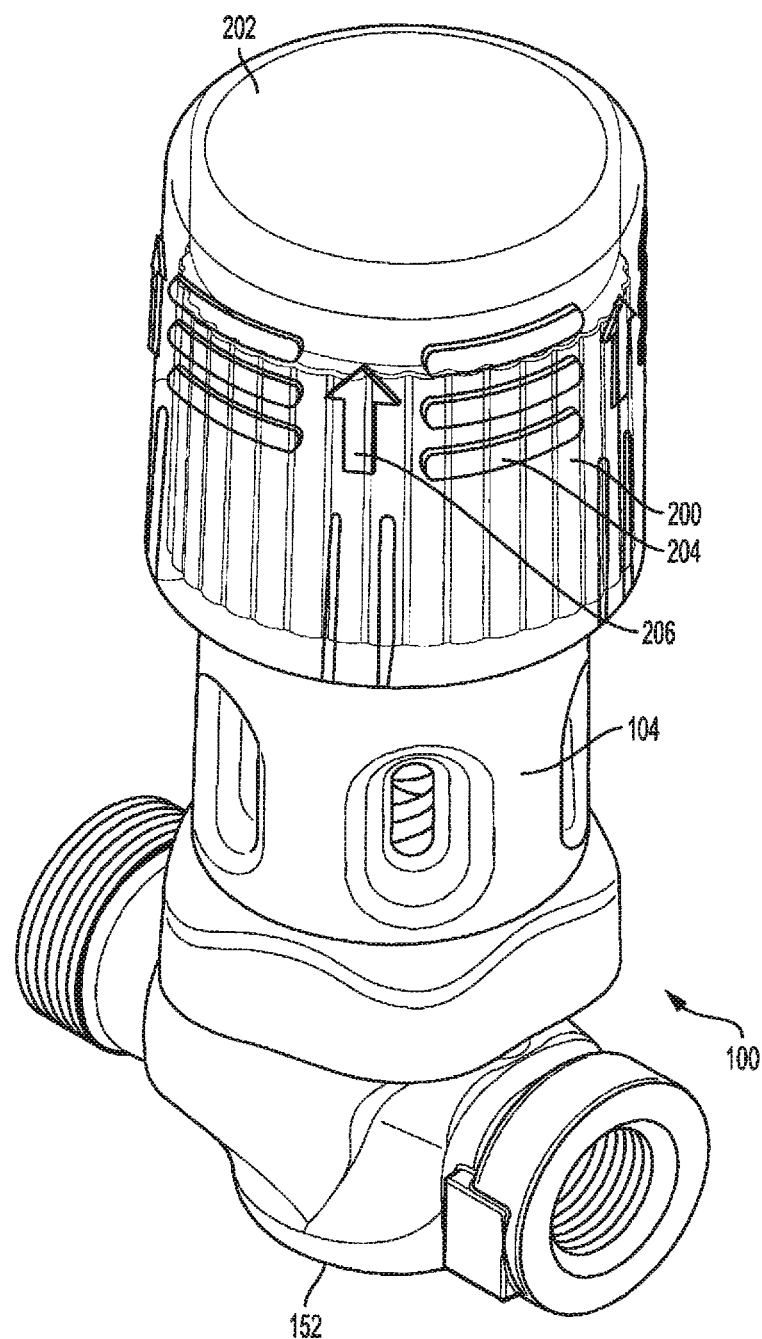
FIG. 13 is a perspective view of a pressure regulator in normal mode with an anti-tamper cover in accordance with the subject disclosure.

Referring to FIG. 13, a perspective view of a pressure regulator 100 in normal mode is shown with an anti-tamper cover 200 in accordance with the subject disclosure. The anti-tamper cover 200 prevents inadvertent adjustment. Preferably, the anti-tamper cover 200 has radially inner projections at a lower open end so that the anti-tamper cover 200 easily snap fits onto the cap 102. The anti-tamper cover 200 is oversized so that if turned, the anti-tamper cover 200 will simply rotate around the cap 102. In effect, only the anti-tamper cover 200 will rotate and no adjustment will occur. The anti-tamper cover 200 will have indicia 202 such as "REMOVE TO ADJUST FILL LEVEL", trademarks, etc. The anti-tamper cover 200 preferably has outer ridges 204 and a directional arrow 206 to facilitate and instruct a user easily unsnapping the anti-tamper cover 200 if adjustment is desired. Preferably, the anti-tamper cover 200 is a clear or translucent plastic cup-shaped shell.

Figure 14:
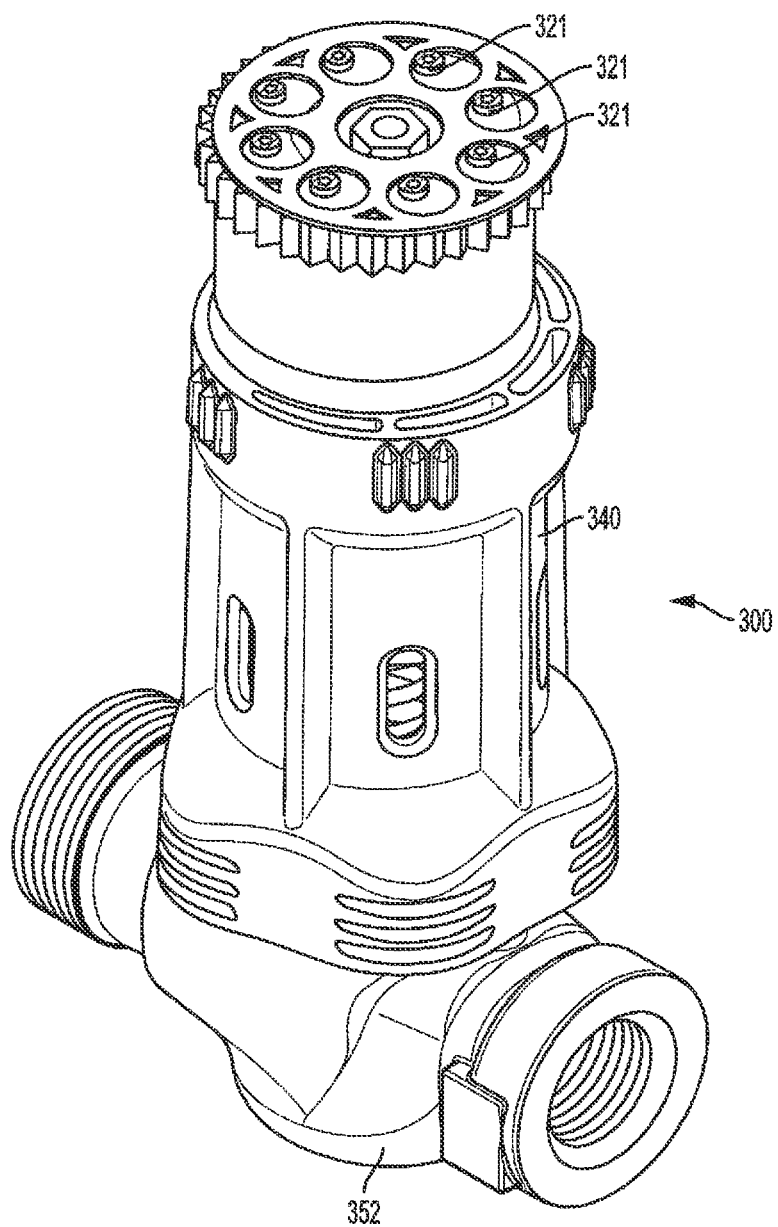
FIG. 14 illustrates a cross-sectional view through another cap in accordance with the subject disclosure.

FIG. 14 illustrates a cross-sectional view through another pressure regulator assembly 300 in accordance with the subject disclosure. In particular, the cross-sectional view is through the cap area although the cap is not shown for illustrative purposes. Similar elements to those described in connection with above-described embodiments are indicated with the like reference numbers. Many elements are similar as those of the foregoing embodiments and, thus, are not further described herein. A difference of the pressure regulator assembly 300 is the dial rotor 312 has a plurality of pins 321. The pins 321 are coupled into a plurality of openings 322 in a setpoint dial 306. By using a plurality of pins 321 to drive the setpoint dial 306, the movement may be more consistent and improved. Additionally, the pressure regulator assembly 300 has a modified spring cage 340. The spring cage 340 has vertical ribs that allow for a thinner wall structure. Thus, relatively less material is required to fabricate the spring cage 340.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., threads, bodies, ridges, cam surfaces, banking surfaces and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the invention.

The invention claimed is:

1. A pressure regulator assembly comprising:
   a regulator valve;
   a spring guide;
   a spring extending between the spring guide and regulator valve for setting operation of the regulator valve;
   a sleeve coupled to the spring guide;
   a spring cage coupled to the sleeve;
   an adjustment stem coupled to the sleeve;
   a dial assembly coupled to the spring cage; and
   an adjustment cap coupled to the adjustment stem,
   wherein:
      when the adjustment cap is depressed, interaction between the spring cage, spring guide and sleeve causes the spring guide to selectively rotate between a normal mode and a fast-fill mode;
      in the normal mode, adjustment of the cap determines an output pressure; and
      in the fast-fill mode, the spring is further compressed by movement of the spring guide to a predetermined setting to provide a predetermined output pressure.

2. The pressure regulator assembly of claim 1, wherein the adjustment cap has a set of inner teeth and the spring guide has outer teeth positioned so that when the adjustment cap is depressed, the set of inner teeth and the outer teeth interact to limit rotation of the adjustment cap.

3. The pressure regulator assembly of claim 1, wherein the spring cage defines at least one viewing window and the spring guide has at least one outer surface that selectively aligns with the at least one viewing window so that when aligned, visibility of the at least one outer surface through the at least one viewing window indicates the fast-fill mode of operation, and when the at least one outer surface does not align for viewing through the at least one window, the pressure regulator is in the normal mode.

4. The pressure regulator assembly of claim 1, wherein the sleeve couples to a lower end of the adjustment stem so that as the adjustment cap is rotated in normal mode, the adjustment stem moves the sleeve and, in turn, the spring guide moves to vary compression of the spring.

5. The pressure regulator assembly of claim 4, wherein the spring cage slidably houses the spring guide and the sleeve in axial slots.

6. The pressure regulator assembly of claim 1, wherein the spring guide has shoulders with angled top banking surfaces and the spring cage forms inner lands that selectively interact with the shoulders of the spring guide.

7. The pressure regulator assembly of claim 6, wherein a bottom of the inner lands forms two cam surfaces and a vertical banking surface that interact with the angled top banking surfaces of the shoulders.

8. A dial assembly for a valve having an adjustment stem along an axis, the dial assembly comprising:
- a cap having a body with an open end, a closed end, inner teeth, and a socket depending from the closed end for coupling to the adjustment stem so that when the cap is turned, the adjustment stem turns to adjust an output of the valve, wherein the closed end defines a viewing window;
- a dial rotor having a pin, a gear portion and defining a central opening through which the adjustment stem passes, wherein the dial rotor is rotatably mounted off-axis within the cap so that the gear portion engages the inner teeth so that when the cap is turned, the dial rotor spins albeit at a slower rate than the cap due to gear reduction between the inner teeth and gear portion; and
- a setpoint dial adjacent the closed end and defining an opening coupled to the pin of the dial rotor, the setpoint dial having numbers selectively aligned with the viewing window to indicate the output of the valve, wherein the setpoint dial is sized and configured so that at least one of the socket and the body substantially center the setpoint dial at all times and the pin moves radially within the slot during rotation of the cap and, in turn, the dial rotor and setpoint dial.

9. A dial assembly as recited in claim 8, further comprising a stem washer mounted on the adjustment stem to set a position of the dial rotor on the adjustment stem.

10. A pressure regulator assembly comprising:
- a regulator valve;
- a spring guide;
- a spring extending between the spring guide and regulator valve for setting operation of the regulator valve;
- a sleeve coupled to the spring guide;
- a spring cage coupled to the sleeve;
- an adjustment stem coupled to the sleeve;
- an adjustment cap coupled to the adjustment stem; and
- a dial assembly,
  wherein:
    when the adjustment cap is depressed, interaction between the spring cage, spring guide and sleeve causes the spring guide to selectively rotate between a normal mode and a fast-fill mode;
    in the normal mode, adjustment of the cap determines an output pressure; and
    in the fast-fill mode, the spring is further compressed by movement of the spring guide to a predetermined setting to provide a predetermined output pressure;
    the adjustment cap having a body with an open end, a closed end, inner teeth, and a socket depending from the closed end for coupling to the adjustment stem so that when the adjustment cap is turned, the adjustment stem turns to adjust an output of the valve, wherein the closed end defines a viewing window;
    the dial assembly including a dial rotor having a pin, a gear portion and defining a central opening through which the adjustment stem passes, wherein the dial rotor is rotatably mounted off-axis within the adjustment cap so that the gear portion engages the inner teeth so that when the adjustment cap is turned, the dial rotor spins albeit at a slower rate than the adjustment cap due to gear reduction between the inner teeth and gear portion;
  a setpoint dial adjacent the closed end and defining an opening coupled to the pin of the dial rotor, the setpoint dial having numbers selectively aligned with the viewing window to indicate the output of the valve, wherein the setpoint dial is sized and configured so that at least one of the socket and the body substantially center the setpoint dial at all times and the pin moves radially within the slot during rotation of the adjustment cap and, in turn, the dial rotor and setpoint dial; and
  a stem washer mounted on the adjustment stem to set a position of the dial rotor thereon.

11. The pressure regulator assembly of claim 10, further comprising an anti-tamper cover that snap fits onto the adjustment cap.

* * * * *